United States Patent
Huang et al.

(10) Patent No.: US 8,526,203 B2
(45) Date of Patent: Sep. 3, 2013

(54) SYSTEMS AND METHODS FOR CONSTANT VOLTAGE MODE AND CONSTANT CURRENT MODE IN FLYBACK POWER CONVERTER WITH PRIMARY-SIDE SENSING AND REGULATION

(75) Inventors: Xiaomin Huang, Shanghai (CN); Yaming Cao, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 736 days.

(21) Appl. No.: 12/581,775

(22) Filed: Oct. 19, 2009

(65) Prior Publication Data
US 2010/0128501 A1    May 27, 2010

Related U.S. Application Data

(60) Provisional application No. 61/107,249, filed on Oct. 21, 2008.

(51) Int. Cl.
*H02M 3/335* (2006.01)

(52) U.S. Cl.
USPC ..................................................... 363/21.16

(58) Field of Classification Search
USPC ................ 363/21.12–21.18, 39, 50, 56.1, 78, 363/95, 97; 323/266, 299, 303
See application file for complete search history.

(56) References Cited

U.S. PATENT DOCUMENTS

| | | | |
|---|---|---|---|
| 3,912,340 A | 10/1975 | Bertolasi | |
| 5,247,241 A | 9/1993 | Ueda | |
| 6,292,376 B1 | 9/2001 | Kato | |
| 6,545,513 B2 | 4/2003 | Tsuchida et al. | |
| 7,345,895 B2 * | 3/2008 | Zhu et al. | 363/21.12 |
| 7,414,865 B2 | 8/2008 | Yang | |
| 7,990,202 B2 * | 8/2011 | Fang et al. | 327/427 |
| 8,305,776 B2 | 11/2012 | Fang | |
| 2006/0050539 A1 | 3/2006 | Yang et al. | |
| 2007/0115696 A1 | 5/2007 | Berghegger | |
| 2007/0171687 A1 | 7/2007 | Kogel et al. | |
| 2008/0112193 A1 | 5/2008 | Yan et al. | |

(Continued)

OTHER PUBLICATIONS

United States Patent and Trademark Office, Office Action mailed Dec. 12, 2011, in related U.S. Appl. No. 12/502,866.
United States Patent and Trademark Office, Notice of Allowance mailed Jul. 10, 2012, in related U.S. Appl. No. 12/502,866.
United States Patent and Trademark Office, Notice of Allowance mailed Jan. 28, 2013, in related U.S. Appl. No. 13/071,384.

(Continued)

*Primary Examiner* — Adolf Berhane
*Assistant Examiner* — Yemane Mehari
(74) *Attorney, Agent, or Firm* — Jones Day

(57) ABSTRACT

System and method for regulating a power converter. The system includes a first signal generator configured to receive at least an input signal and generate at least a first output signal associated with demagnetization and a second output signal associated with sampling. Additionally, the system includes a sampling component configured to receive at least the input signal and the second output signal, sample the input signal based on at least information associated with the second output signal, and generate at least a third output signal associated with one or more sampled magnitudes. Moreover, the system includes an error amplifier configured to receive at least the third output signal and a first threshold voltage and generate at least a fourth output signal with a capacitor, the capacitor being coupled to the error amplifier.

33 Claims, 20 Drawing Sheets

(56) References Cited

U.S. PATENT DOCUMENTS

| | | |
|---|---|---|
| 2008/0157742 A1 | 7/2008 | Martin et al. |
| 2008/0252345 A1 | 10/2008 | Deschamp et al. |
| 2009/0058387 A1 | 3/2009 | Huynh et al. |
| 2009/0073727 A1 | 3/2009 | Huynh et al. |
| 2009/0302817 A1 | 12/2009 | Nagai |
| 2010/0061126 A1 | 3/2010 | Huynh et al. |
| 2011/0248770 A1* | 10/2011 | Fang et al. .................. 327/427 |

OTHER PUBLICATIONS

United States Patent and Trademark Office, Office Action mailed Dec. 5, 2012, in related U.S. Appl. No. 12/859,138.

United States Patent and Trademark Office, Office Action mailed Feb. 15, 2013, in related U.S. Appl. No. 13/052,869.

United States Patent and Trademark Office, Notice of Allowance mailed Mar. 25, 2013, in related U.S. Appl. No. 13/071,384.

* cited by examiner ly winding and the switch frequency may also result in poor regulation of output current.

Hence it is highly desirable to improve the techniques of primary-side sensing and regulation.

SYSTEMS AND METHODS FOR CONSTANT VOLTAGE MODE AND CONSTANT CURRENT MODE IN FLYBACK POWER CONVERTER WITH PRIMARY-SIDE SENSING AND REGULATION

1. CROSS-REFERENCES TO RELATED APPLICATIONS

This application claims priority to U.S. Provisional No. 61/107,249, filed Oct. 21, 2008, commonly assigned, incorporated by reference herein for all purposes.

Additionally, this application is related to U.S. patent application Ser. No. 12/502,866, commonly assigned, incorporated by reference herein for all purposes.

2. BACKGROUND OF THE INVENTION

The present invention is directed to integrated circuits. More particularly, the invention provides systems and methods for constant voltage mode and constant current mode. Merely by way of example, the invention has been applied to a flyback power converter with primary-side sensing and regulation. But it would be recognized that the invention has a much broader range of applicability.

Flyback power converters have been used extensively for their simple structures and low costs in low power applications. But in traditional flyback converters, the output voltage regulation often is performed with secondary-side feedback, using an isolated arrangement of TL431 and an opto-coupler. In addition to increasing the system cost, the voltage drop due to the cable loss usually is difficult to compensate.

FIG. 1 is a simplified conventional diagram for a switch-mode flyback power conversion system with secondary-side control. As shown in FIG. 1, a PWM controller 110 is used to control and drive a power MOSFET M1. The power MOSFET M1 is turned on and off to control the power delivered to the load on the secondary side. Consequently, the constant output voltage (CV) mode and the constant output current (CC) mode may be achieved by the secondary-side regulation.

FIG. 2 is a simplified conventional diagram showing characteristics of output voltage and output current of a flyback power conversion system. As shown in FIG. 2, if the output current $I_o$ is in the range of from zero to $I_{max}$, the system operates in the constant voltage (CV) mode. In the CV mode, the output voltage $V_o$ is equal to $V_{max}$. Alternatively, if the output voltage is below $V_{max}$, the system operates in the constant current (CC) mode. In the CC mode, the output current $I_o$ is equal to $I_{max}$. For example, if the output terminal of the system is connected to a discharged battery, the system operates in the CC mode.

To reduce cost and size of the switch-mode flyback power converter and to also improve its efficiency, the power converter with primary-side regulation has become more and more popular. With the primary-side regulation, the output voltage is sensed by detecting the voltage of an auxiliary winding that is tightly coupled to the secondary winding. Since the voltage of the auxiliary winding images the output voltage that is associated with the secondary winding, the voltage sensed in the auxiliary winding can be utilized to regulate the secondary-side output voltage. The expensive parts of TL431 and opto-coupler usually are not needed, so the cost and size can be reduced. Additionally, using sensed information of the output voltage, the output current can be regulated based on internal computation of the controller. Therefore the sensing resistor for output current often is not needed, so the overall conversion efficiency can be improved.

FIG. 3 is a simplified conventional diagram for a switch-mode flyback power conversion system with primary-side sensing and regulation. FIG. 4 is another simplified conventional diagram for a switch-mode flyback power conversion system with primary-side regulation.

As shown, the output voltage $V_{out}$ is mapped to the DC voltage $V_{INV}$ at the node INV, and is therefore regulated through the regulation of $V_{INV}$.

With primary-side regulation, the relationship of $V_{INV}$ and $V_{out}$ can be expressed as:

$$V_{INV} = \frac{n \cdot R_2}{R_1 + R_2} \cdot (V_{out} + V_{D2}) - \frac{R2}{R1 + R2} V_{D1} \quad (1)$$

where n is the ratio of auxiliary-winding turns to secondary-winding turns. Additionally, $V_{D1}$ and $V_{D2}$ are the forward diode drop voltages.

Setting $$k = \frac{R_1 + R_2}{n \cdot R_2},$$

$V_{out}$ is therefore given by:

$$V_{out} = k \cdot V_{INV} + \frac{1}{n} V_{D1} - V_{D2} \quad (2)$$

The output voltage is regulated through the regulation of the voltage for the auxiliary winding. For example, the sensed voltage, $V_{INV}$, is compared with a predetermined voltage level, $V_{REF}$. The difference between $V_{INV}$ and $V_{REF}$ is associated with an error signal, which is amplified by an error amplifier. Based at least in part on the amplified error signal, a PWM/PFM signal is generated.

The PWM/PFM signal controls turning on/off of a power switch and thus controls the power delivered to the secondary side. As a result, the difference between $V_{INV}$ and $V_{REF}$ becomes smaller and smaller, and eventually $V_{INV}$ becomes equal to $V_{REF}$. Since $V_{INV}$ is the image of the output voltage $V_{out}$, the output voltage $V_{out}$ can be linearly dependent on $V_{INV}$ and thus $V_{REF}$, if certain conditions are satisfied.

Specifically, as shown below, the output voltage $V_{out}$ linearly depends on $V_{REF}$ if the forward voltage across diodes D1 and D2 are constant.

$$V_{out} = k \cdot V_{REF} + \frac{1}{n} V_{D1} - V_{D2} \quad (3)$$

But the forward voltage of a diode often depends on the current that flows through the diode. Hence the forward voltage of D2 changes if the load current changes. The forward voltage of D1 is almost constant since the current flowing through D1 does not change even if the output load current changes.

Therefore, the control scheme as described above often has poor regulation for output voltage due to the change in the forward voltage of the diode D2. Moreover, the fact that the output current depends on the inductance of the primary windings often results in large variations in the output current which usually cannot be compensated in the mass production.

Hence it is highly desirable to improve techniques for output voltage regulation and output current control, such as primary-winding inductance compensation, is highly desirable.

3. BRIEF SUMMARY OF THE INVENTION

The present invention is directed to integrated circuits. More particularly, the invention provides systems and methods for constant voltage mode and constant current mode. Merely by way of example, the invention has been applied to a flyback power converter with primary-side sensing and regulation. But it would be recognized that the invention has a much broader range of applicability.

According to one embodiment, a system for regulating a power converter includes a first signal generator configured to receive at least an input signal and generate at least a first output signal associated with demagnetization and a second output signal associated with sampling. Additionally, the system includes a sampling component configured to receive at least the input signal and the second output signal, sample the input signal based on at least information associated with the second output signal, and generate at least a third output signal associated with one or more sampled magnitudes. Moreover, the system includes an error amplifier configured to receive at least the third output signal and a first threshold voltage and generate at least a fourth output signal with a capacitor, the capacitor being coupled to the error amplifier. Also, the system includes a compensation component configured to receive at least the fourth output signal and generate at least a compensation signal. The input signal is a combination of the compensation signal and a first sensed signal. The first sensed signal is associated with a first winding coupled to a secondary winding for a power converter, and the secondary winding is related to an output current and an output voltage for the power converter. Additionally, the system includes the first controller for regulating at least the output current. For example, the first controller is configured to receive at least the first output signal and the third output signal and generate at least a first control signal based on at least information associated with the first output signal and the third output signal. Moreover, the system includes a second controller for regulating at least the output voltage. For example, the second controller being configured to receive at least the fourth output signal and generate at least a second control signal and a third control signal based on at least information associated with the fourth output signal. Also, the system includes an oscillator configured to receive at least the first control signal and the second control signal and generate at least a clock signal, and a second signal generator configured to receive at least the clock signal, the third control signal, and a fourth control signal, and generate at least a modulation signal. Additionally, the system includes a gate driver configured to receive at least the modulation signal and output at least a drive signal to a switch. For example, the switch is configured to affect a first current flowing through a primary winding coupled to the secondary winding. Moreover, the system includes a third controller for regulating at least a peak current. For example, the third controller being configured to receive the third control signal, a second sensed signal, and a second threshold voltage, and output the fourth control signal to the second signal generator. In another example, the second sensed signal is associated with the first current flowing through the primary winding for the power converter.

According to another embodiment, a system for regulating a power converter includes a sampling component configured to receive at least an input signal, sample the input signal, and generate at least a first output signal associated with one or more sampled magnitudes. For example, the input signal being associated with at least a first winding coupled to a secondary winding for a power converter, and the secondary winding is related to an output current and an output voltage for the power converter. Additionally, the system includes an error amplifier configured to receive at least the first output signal and a threshold voltage, generate a second output signal with a capacitor, and generate a third output signal, the capacitor being coupled to the error amplifier. Moreover, the system includes a feed forward component configured to receive the third output signal and generate a fourth output signal based on at least information associated with the third output signal, and a controller for regulating at least the output voltage. For example, the controller is configured to receive at least the second output signal and the fourth output signal, and generate at least a first control signal. Also, the system includes a signal generator configured to receive at least the first control signal and generate at least a modulation signal based on at least information associated with the first control signal, and a gate driver configured to receive at least the modulation signal and output at least a drive signal to a switch. For example, the switch is configured to affect a first current flowing through a primary winding coupled to the secondary winding.

According to yet another embodiment, a system for regulating a power converter includes a sampling component configured to receive at least an input signal, sample the input signal, and generate at least a first output signal associated with one or more sampled magnitudes, and an error amplifier configured to receive at least the first output signal and a threshold voltage, generate a second output signal with a capacitor, and generate a third output signal, the capacitor being coupled to the error amplifier. Additionally, the system includes a feed forward component configured to receive the third output signal and generate a fourth output signal based on at least information associated with the third output signal, and a controller configured to receive at least the second output signal and the fourth output signal, and generate at least a control signal. Moreover, the system includes a compensation component configured to receive at least the second output signal and generate at least a compensation signal based on at least information associated with the second output signal, the input signal being a combination of the compensation signal and another signal.

According to yet another embodiment, a system for regulating a power converter includes a first signal generator configured to receive at least an input signal and generate at least a first output signal associated with demagnetization and a second output signal associated with sampling. For example, the input signal is associated with at least a first winding coupled to a secondary winding for a power converter, and the secondary winding is related to an output current and an output voltage for the power converter. Additionally, the system includes a sampling component configured to receive at least the input signal and the second output signal, sample the input signal based on at least information associated with the second output signal, and generate at least a third output signal associated with one or more sampled magnitudes. Moreover, the system includes a first controller for regulating at least the output current, which is configured to receive at least the first output signal and the third output signal and generate at least a first control signal based on at least information associated with the first output signal and the third output signal. Also, the system includes an oscillator configured to receive at least the first control signal and generate at least a clock signal based on at least information associated with the first control signal, and a second signal generator configured to receive at least the clock signal and a second control signal, and generate at least a modulation signal based on at least information associated with the clock signal and the second control signal. Additionally, the system includes a gate driver configured to receive at least the modulation signal and output at least a drive signal to a switch. For example, the switch is configured to affect a first current flowing through a primary winding coupled to the secondary winding. Moreover, the system includes a third controller for regulating at least a peak current is configured to receive at least a sensed signal and a threshold voltage, and output the second control signal to the second signal generator. For example, the sensed signal is associated with the first current flowing through the primary winding for the power converter. The modulation signal corresponds to a switching frequency, and the first output signal corresponds to a demagnetization pulse width.

According to yet another embodiment, a system for regulating a power converter includes a controller for regulating at least a peak current. For example, the controller is configured to receive at least a sensed signal and a first threshold voltage and generate at least a first control signal, and the sensed signal is associated with a first current flowing through a primary winding for a power converter. Additionally, the system includes a signal generator configured to receive at least the first control signal and generate at least a modulation signal, and a gate driver configured to receive at least the modulation signal and output at least a drive signal to a switch. For example, the switch is configured to affect the first current. In another example, the controller includes a first comparator configured to receive the sensed signal and the first threshold voltage and generate a comparison signal based on at least information associated with the sensed signal and the first threshold voltage, and a charge pump configured to receive the comparison signal and generate a second control signal based on at least information associated with the comparison signal. Additionally, the controller includes a threshold generator configured to receive the second control signal and generate a second threshold voltage based on at least information associated with the second control signal, and a second comparator configured to receive the second threshold voltage and the sensed signal and generate the first control signal based on at least information associated with the second threshold voltage and the sensed signal.

According to yet another embodiment, a method for regulating a power converter includes receiving at least an input signal by a first signal generator, and generating at least a first output signal associated with demagnetization and a second output signal associated with sampling based on at least information associated with the input signal. Additionally, the method includes receiving at least the input signal and the second output signal by a sampling component, sampling the input signal based on at least information associated with the second output signal, generating at least a third output signal associated with one or more sampled magnitudes, receiving at least the third output signal and a first threshold voltage by an error amplifier, and generating at least a fourth output signal with a capacitor coupled to the error amplifier. Moreover, the method includes receiving at least the fourth output signal by a compensation component, and generating at least a compensation signal based on at least information associated with the fourth output signal. For example, the input signal is a combination of the compensation signal and a first sensed signal. In another example, the first sensed signal is associated with a first winding coupled to a secondary winding for a power converter, and the secondary winding is related to an output current and an output voltage for the power converter. Also, the method includes receiving at least the first output signal and the third output signal by a first controller for regulating at least the output current, generating at least a first control signal based on at least information associated with the first output signal and the third output signal, receiving at least the fourth output signal by a second controller for regulating at least the output voltage, and generating at least a second control signal and a third control signal based on at least information associated with the fourth output signal. Additionally, the method includes receiving at least the first control signal and the second control signal by an oscillator, generating at least a clock signal by the oscillator, receiving at least the clock signal, the third control signal, and a fourth control signal by a second signal generator, and generating at least a modulation signal by the second signal generator. Moreover, the method includes receiving at least the modulation signal by a gate driver, outputting at least a drive signal to a switch to affect a first current flowing through a primary winding coupled to the secondary winding, receiving the third control signal, a second sensed signal, and a second threshold voltage by a third controller for regulating at least a peak current; and outputting the fourth control signal to the second signal generator. For example, the second sensed signal is associated with the first current flowing through the primary winding for the power converter.

According to yet another embodiment, a method for regulating a power converter includes receiving at least an input signal by a sampling component. For example, the input signal is associated with at least a first winding coupled to a secondary winding for a power converter, and the secondary winding is related to an output current and an output voltage for the power converter. Additionally, the method includes sampling the input signal by the sampling component, generating at least a first output signal associated with one or more sampled magnitudes, receiving at least the first output signal and a threshold voltage by an error amplifier, and generating a second output signal with a capacitor coupled to the error amplifier. Moreover, the method includes generating a third output signal by the error amplifier, receiving the third output signal by a feed forward component, generating a fourth output signal based on at least information associated with the third output signal, receiving at least the second output signal and the fourth output signal by a controller for regulating at least the output voltage, and generating at least a first control signal based on at least information associated with the second output signal and the fourth output signal. Also, the method includes receiving at least the first control signal by a signal generator, generating at least a modulation signal based on at least information associated with the first control signal, receiving at least the modulation signal by a gate driver, and outputting at least a drive signal to a switch to affect a first current flowing through a primary winding coupled to the secondary winding.

According to yet another embodiment, a method for regulating a power converter includes receiving at least an input signal by a sampling component, sampling the input signal by the sampling component, and generating at least a first output signal associated with one or more sampled magnitudes. Additionally, the method includes receiving at least the first output signal and a threshold voltage by an error amplifier, generating a second output signal with a capacitor coupled to the error amplifier based on at least information associated with the first output signal and the threshold voltage, and generating a third output signal based on at least information associated with the first output signal and the threshold voltage. Moreover, the method includes receiving the third output signal by a feed forward component, generating a fourth output signal based on at least information associated with the third output signal, receiving at least the second output signal and the fourth output signal by a controller, and generating at least a control signal based on at least information associated with the second output signal and the fourth output signal. Also, the method includes receiving at least the second output signal by a compensation component, and generating at least a compensation signal based on at least information associated with the second output signal, the input signal being a combination of the compensation signal and another signal.

According to yet another embodiment, a method for regulating a power converter includes receiving at least an input signal by a first signal generator. For example, the input signal is associated with at least a first winding coupled to a secondary winding for a power converter, and the secondary winding is related to an output current and an output voltage for the power converter. Additionally, the method includes generating at least a first output signal associated with demagnetization and a second output signal associated with sampling based on at least information associated with the input signal, receiving at least the input signal and the second output signal by a sampling component, sampling the input signal based on at least information associated with the second output signal, and generating at least a third output signal associated with one or more sampled magnitudes. Moreover, the method includes receiving at least the first output signal and the third output signal by a first controller for regulating at least the output current, generating at least a first control signal based on at least information associated with the first output signal and the third output signal, receiving at least the first control signal by an oscillator, and generating at least a clock signal based on at least information associated with the first control signal. Also, the method includes receiving at least the clock signal and a second control signal by a second signal generator, generating at least a modulation signal based on at least information associated with the clock signal and the second control signal, receiving at least the modulation signal by a gate driver, and outputting at least a drive signal to a switch to affect a first current flowing through a primary winding coupled to the secondary winding. Additionally, the method includes receiving at least a sensed signal and a threshold voltage by a third controller for regulating at least a peak current, and outputting the second control signal to the second signal generator. The sensed signal being associated with the first current flowing through the primary winding for the power converter, the modulation signal corresponds to a switching frequency, and the first output signal corresponds to a demagnetization pulse width.

According to yet another embodiment, a method for regulating a power converter includes receiving at least a sensed signal and a first threshold voltage by a controller for regulating at least a peak current. For example, the sensed signal is associated with a first current flowing through a primary winding for a power converter. Additionally, the method includes generating at least a first control signal based on at least information associated with the sensed signal and the first threshold voltage, receiving at least the first control signal by a signal generator, generating at least a modulation signal based on at least information associated with the first control signal, receiving at least the modulation signal by a gate driver, and outputting at least a drive signal to a switch to affect the first current. The process for generating at least a first control signal includes receiving the sensed signal and the first threshold voltage by a first comparator, generating a comparison signal based on at least information associated with the sensed signal and the first threshold voltage, receiving the comparison signal by a charge pump, generating a second control signal based on at least information associated with the comparison signal, receiving the second control signal by a threshold generator, generating a second threshold voltage based on at least information associated with the second control signal, receiving the second threshold voltage and the sensed signal by a second comparator, and generating the first control signal based on at least information associated with the second threshold voltage and the sensed signal.

Many benefits are achieved by way of the present invention over conventional techniques. Certain embodiments of the present invention can reduce parts count and/or decrease system cost. Some embodiments of the present invention can improve reliability and/or efficiency. Certain embodiments of the present invention can simplify circuit design in switch mode flyback power converters. Some embodiments of the present invention provide a primary side sensing and regulation scheme. For example, the primary side sensing and regulation scheme can improve the load regulation. In another example, the primary side sensing and regulation scheme can compensate the primary winding inductance variation to achieve constant output current in a flyback converter that employs the primary side regulation. Certain embodiments of the present invention can provide, in the CC mode, a constant output current that does not change as primary winding inductance changes.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for constant voltage mode and constant current mode. Merely by way of example, the invention has been applied to a flyback power converter with primary-side sensing and regulation. But it would be recognized that the invention has a much broader range of applicability.

Figure 1:
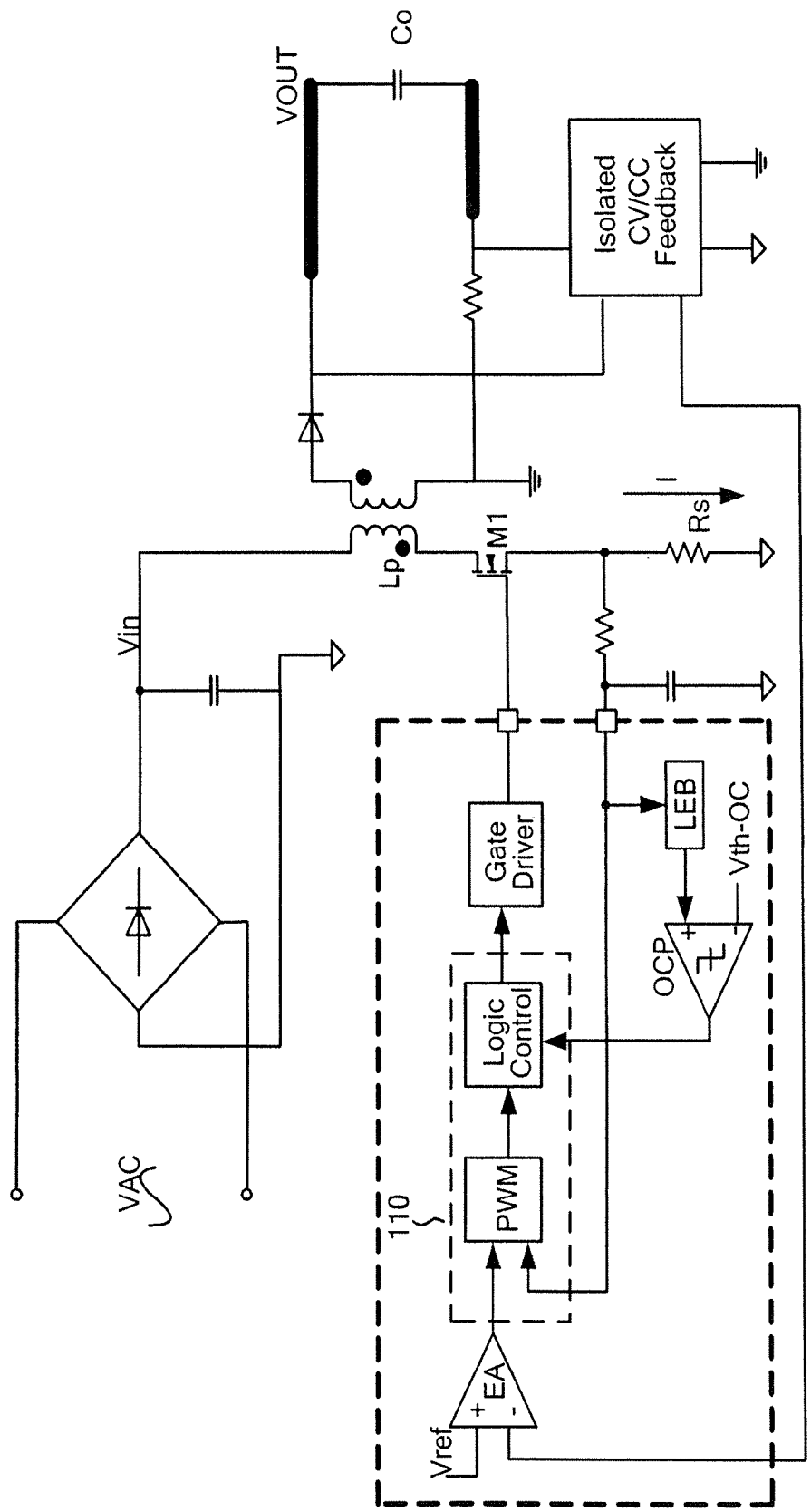
FIG. 1 is a simplified conventional diagram for a switch-mode flyback power conversion system with secondary-side control.
Figure 2:
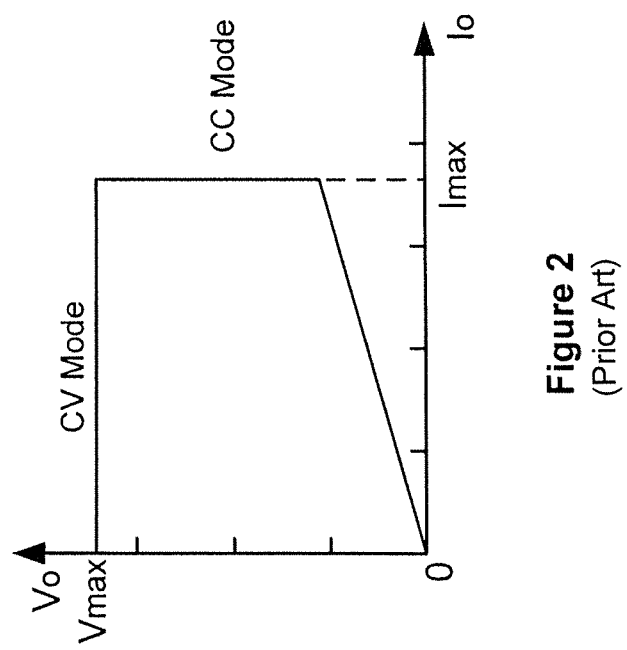
FIG. 2 is a simplified conventional diagram showing characteristics of output voltage and output current of a flyback power conversion system
Figure 3:
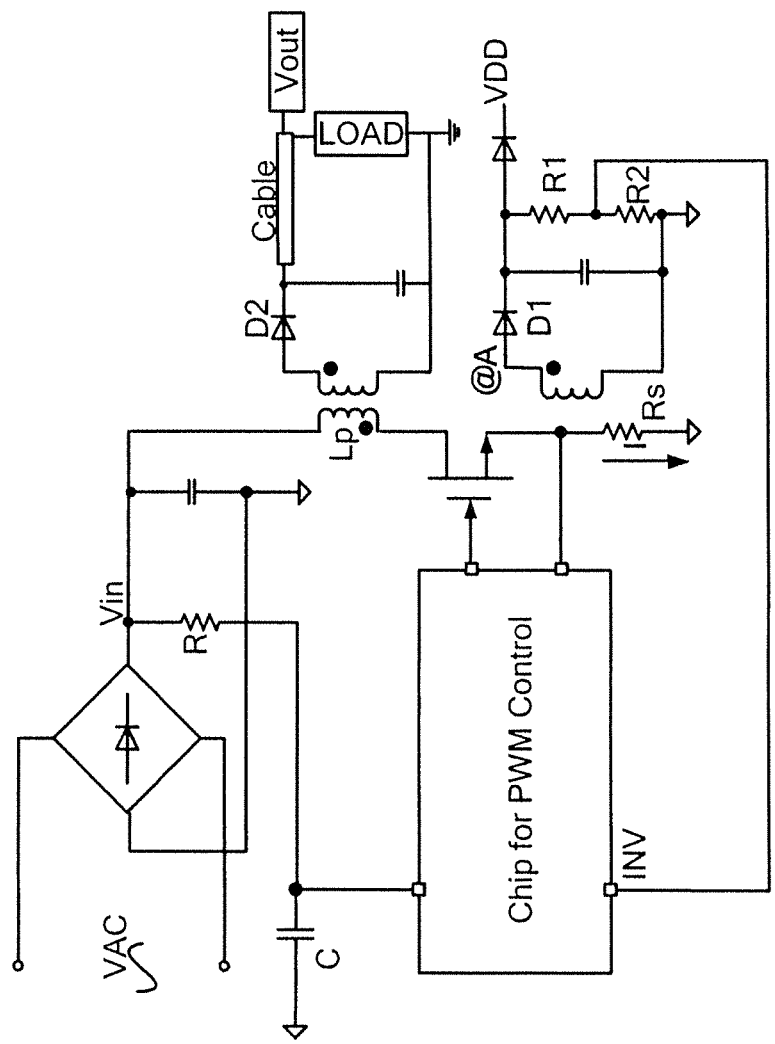
FIG. 3 is a simplified conventional diagram for a switch-mode flyback power conversion system with primary-side sensing and regulation.
Figure 4:
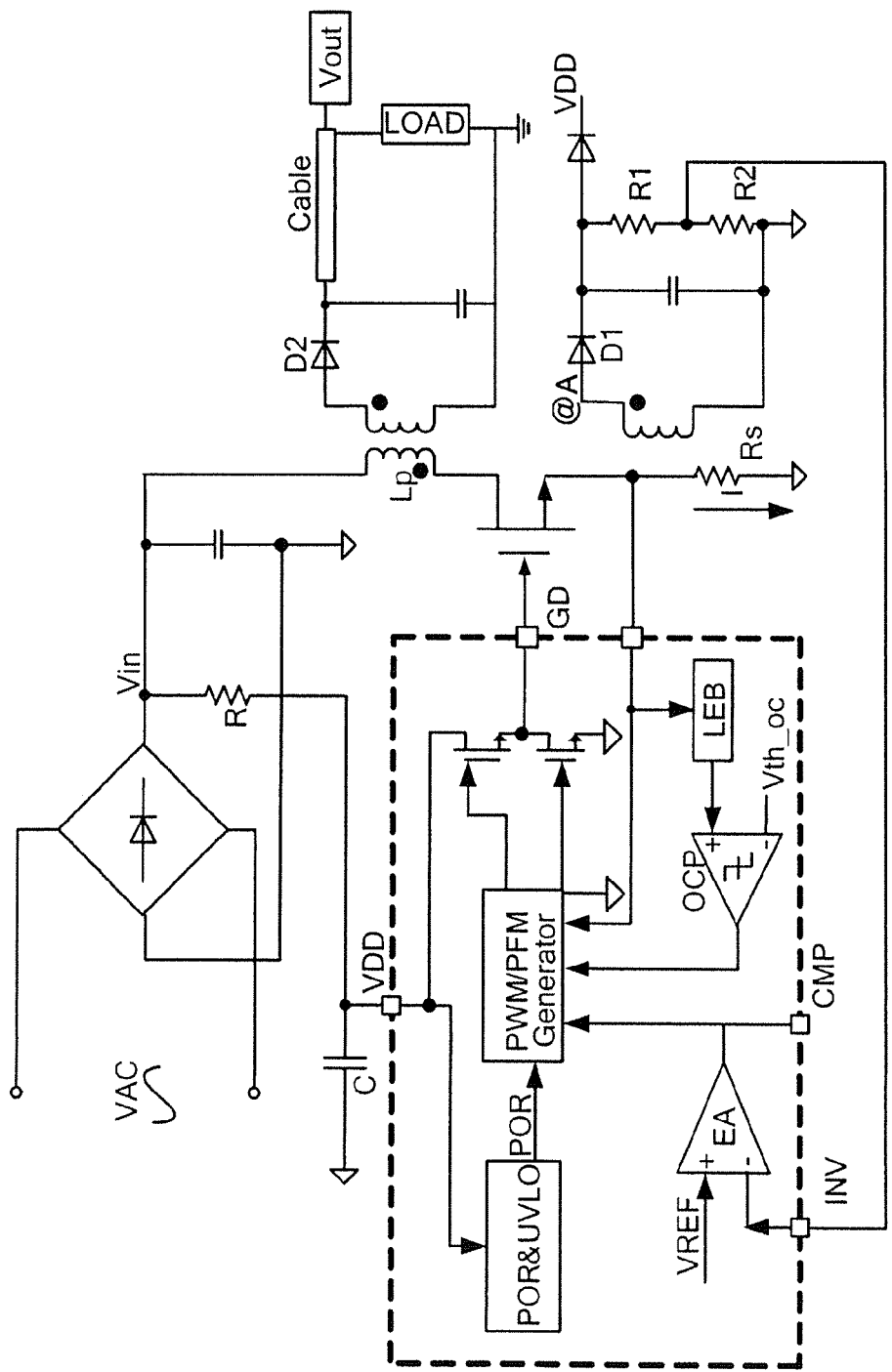
FIG. 4 is another simplified conventional diagram for a switch-mode flyback power conversion system with primary-side regulation.
Figure 5:
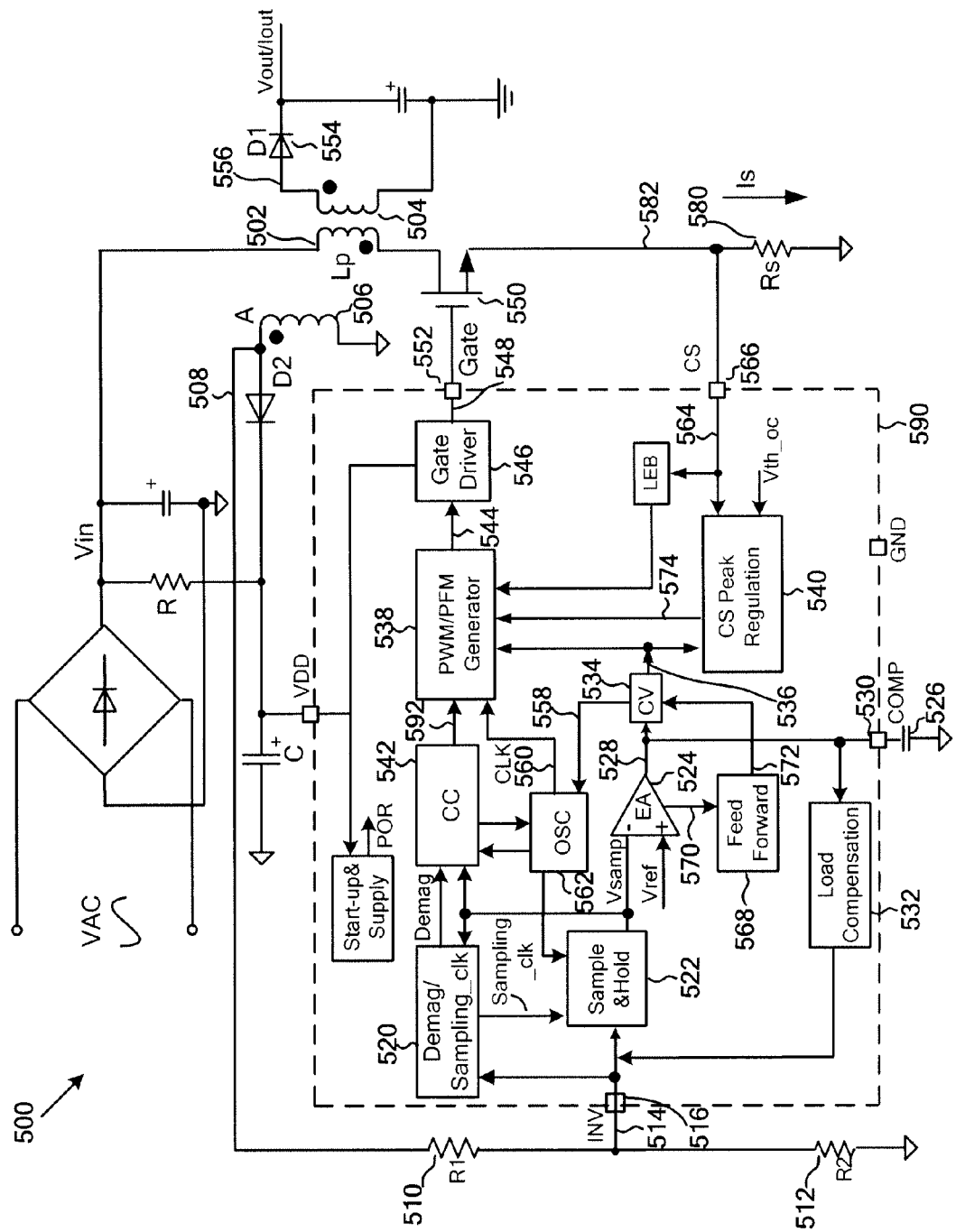
FIG. 5 is a simplified diagram for a switch-mode power conversion system with primary-side sensing and regulation according to an embodiment of the present invention.

FIG. 5 is a simplified diagram for a switch-mode power conversion system with primary-side sensing and regulation according to an embodiment of the present invention. This diagram is merely an example, which should not unduly limit the scope of the claims. One of ordinary skill in the art would recognize many variations, alternatives, and modifications.

A switch-mode power conversion system 500 includes a primary winding 502, a secondary winding 504, and an auxiliary winding 506. Additionally, the conversion system 500 includes resistors 510, 512, and 580. Moreover, the conversion system 500 includes a capacitor 526, a switch 550, and a diode 554. Also, the conversion system 500 includes the following components:

- a component 520 for generating a Demag signal and a Sampling_clk signal;
- a component 522 for sampling and holding one or more signals;
- an error amplifier 524;
- a component 532 for load compensation;
- a component 534 for constant voltage (CV) control;
- a component 538 for generating a PWM/PFM modulation signal;
- a component 540 for current sensing (CS) peak regulation;
- a component 542 for constant current (CC) control;
- a component 546 for generating a gate drive signal;
- an oscillator 562; and
- a component 568 for feed forward.

In one embodiment, the components 520, 522, 532, 534, 538, 540, 542, 546, and 568, the error amplifier 524, and the oscillator 562 are located on a chip 590. For example, the chip 590 includes at least terminals 516, 530, 552, and 566. Although the above has been shown using a selected group of components for the system 500, there can be many alternatives, modifications, and variations. For example, some of the components may be expanded and/or combined. Other components may be inserted to those noted above. Depending upon the embodiment, the arrangement of components may be interchanged with others replaced. For example, the system 500 is a switch-mode flyback power conversion system. Further details of these components are found throughout the present specification and more particularly below.

As shown in FIG. 5, an output voltage $V_{out}$ is sensed by the primary side of the conversation system 500 according to an embodiment of the present invention. For example, the sensing of the output voltage $V_{out}$ depends at least in part on the ratio of turns between the secondary winding 504 and the auxiliary winding 506. For example, the secondary winding 504 is coupled tightly to the auxiliary winding 506. In another example, the secondary winding 504 sends a signal 556 to the diode 554, and is coupled to the output of the conversion system 500 through the diode 554.

In one embodiment, an output signal 508 of the auxiliary winding 506 is represented by $V_{AUX}$. In another embodiment, the output signal 508 is processed by a voltage divider including the resistor 510 (i.e., $R_1$) and the resistor 512 (i.e., $R_2$). From the voltage divider, an output signal 514 (i.e., $V_{INV}$) is fed into the terminal 516 (i.e., the terminal INV). For example, the output signal 514 is load compensated by the component 532. In another example, the compensated signal 514 is fed into both the components 520 and 522.

Figure 8:
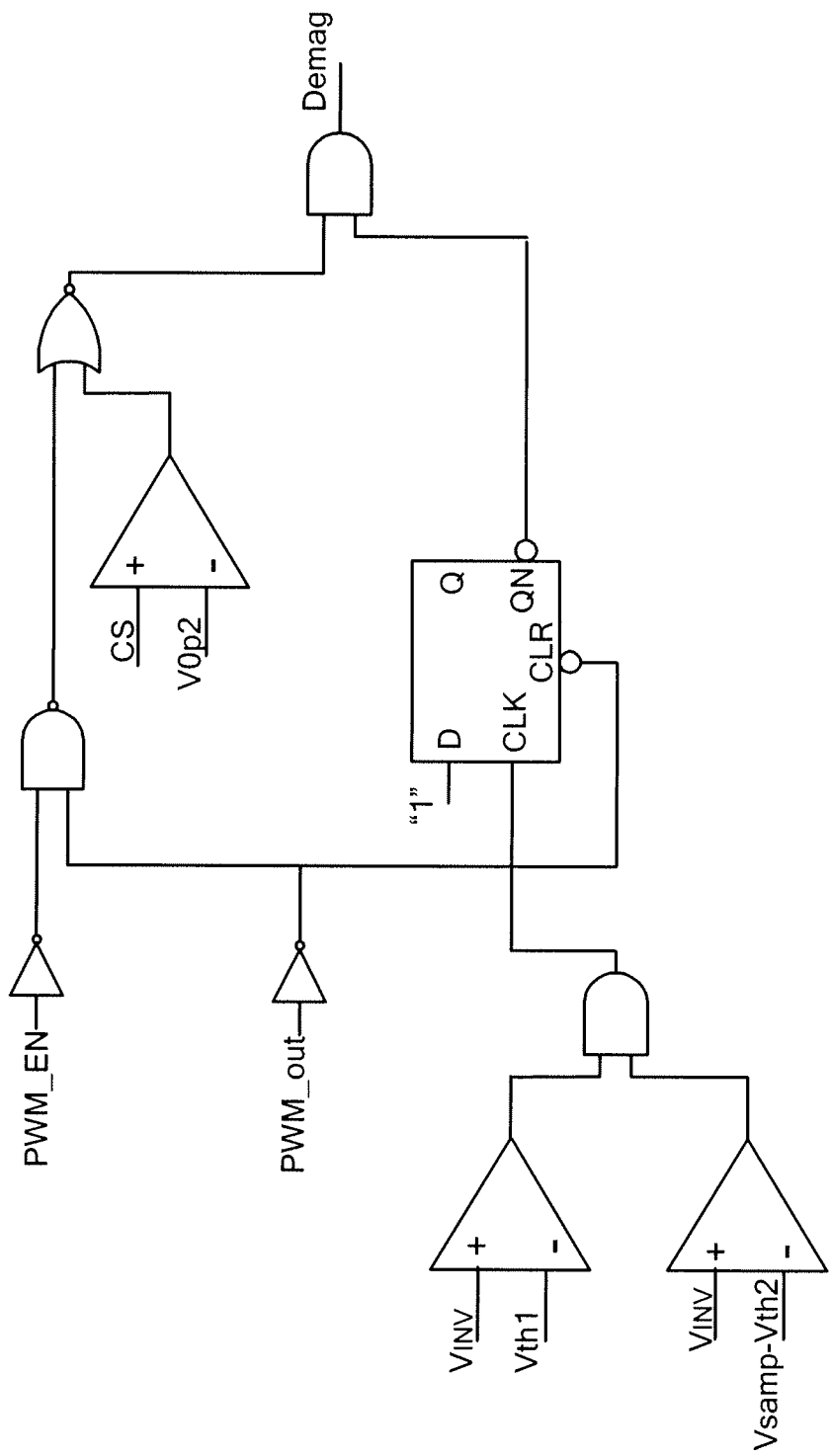
FIG. 8 is a simplified diagram showing certain devices for generating the Demag signal for a component as part of the switch-mode power conversion system according to an embodiment of the present invention.
Figure 9:
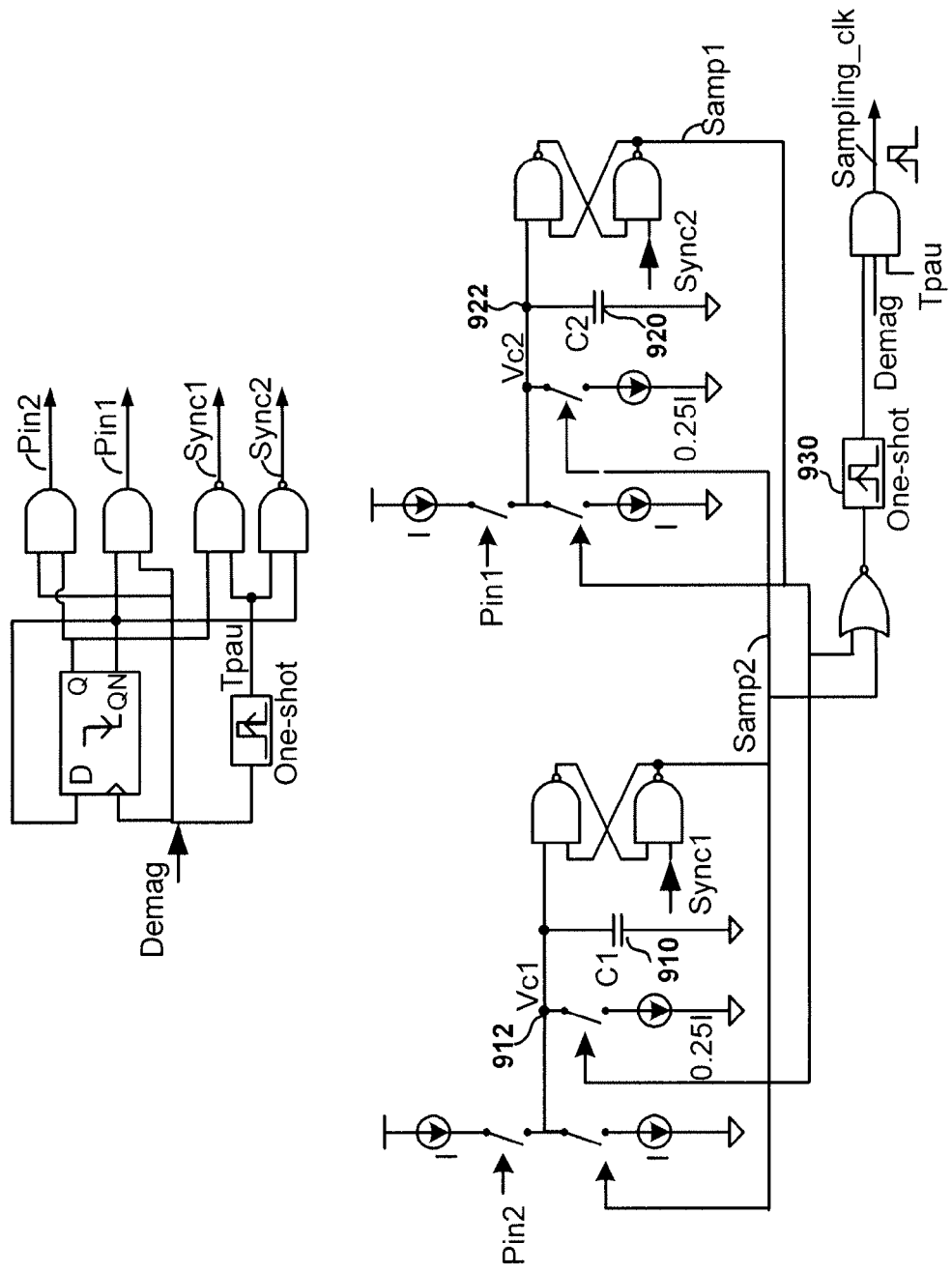
FIG. 9 is a simplified diagram showing certain devices for generating the Sampling_clk signal for a component as part of the switch-mode power conversion system according to an embodiment of the present invention.

According to an embodiment, the component 532 includes one or more devices as shown in FIGS. 12(a), 12(b), 13(a), and/or 13(b). According to another embodiment, the component 520 includes certain devices as shown in FIGS. 8 and 9. For example, the component 520 outputs the Sampling_clk signal to the component 522. Using the Sampling_clk signal, the component 522 generates a Holding_clk signal.

Figure 6:
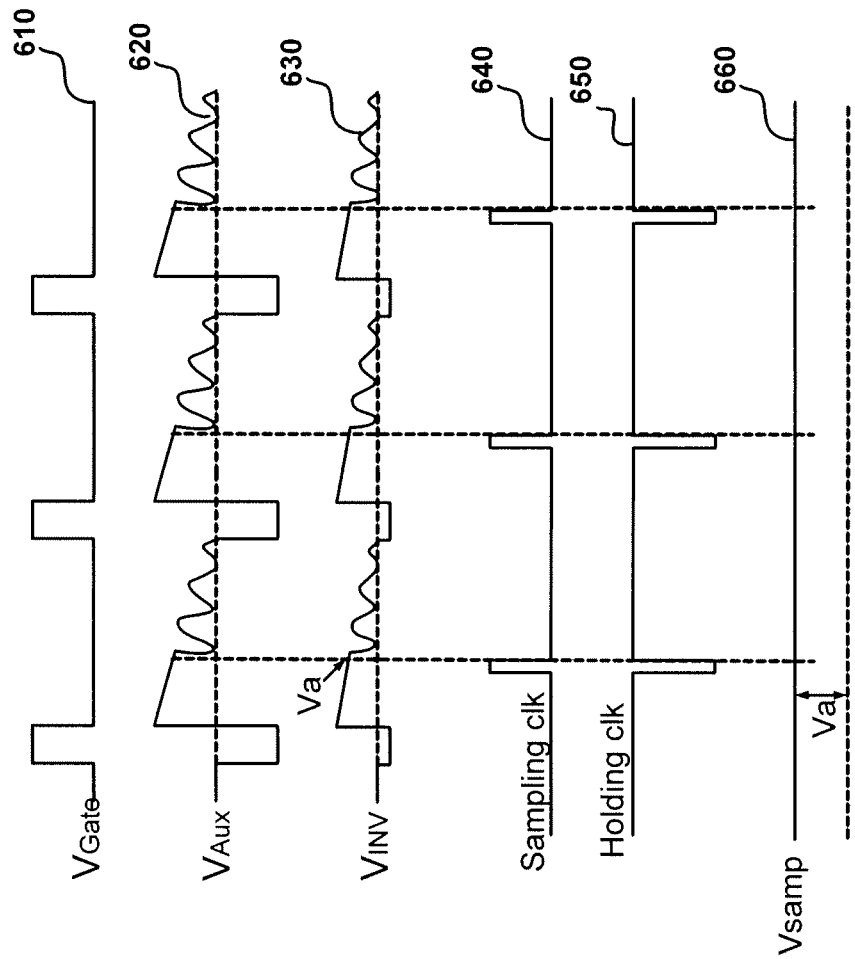
FIG. 6 is a simplified timing diagram for signal sampling and holding as performed by a component as part of the switch-mode power conversion system according to an embodiment of the present invention.

In one embodiment, the component 522 samples the compensated signal 514 based on the Sampling_clk signal, and holds the sampled signal based on the Holding_clk signal. For example, the component 522 samples the compensated signal 514 near the end of de-magnetization and holds the sampled signal until the next sampling. In another example, the sampling and holding process is shown in FIG. 6.

Also as shown in FIG. 5, a sampled and held signal $V_{samp}$ is sent from the component 522 to the error amplifier 524. According to certain embodiments, the component 524 includes some devices as shown in FIGS. 12(a), 12(b), 13(a), and/or 13(b). The error amplifier 524 also receives a reference signal $V_{ref}$. For example, the reference signal $V_{ref}$ is compensated based on the output loading of the conversion system 500. In another example, the signal $V_{samp}$ is compared with the reference signal $V_{ref}$, and their difference is amplified by the error amplifier 524. In one embodiment, the error amplifier 524 generates an output signal 528 with the capacitor 526. For example, the capacitor 526 is connected to the error amplifier 524 through the terminal 530 (i.e., the terminal COMP). In another example, the output signal 528 (i.e., $V_{COMP}$) reflects the load condition. In yet another example, $V_{COMP}$ is used to affect the PWM/PFM switching frequency and the PWM/PFM pulse width in order to regulate the output voltage $V_{out}$.

As shown in FIG. 5, the output signal 528 is sent to the components 532 and 534. For example, the component 534 keeps the output voltage $V_{out}$ constant in the constant voltage (CV) mode. In another example, the component 534 sends a control signal 536 to the component 538 and a control signal 558 to the oscillator 562. In response, the oscillator 562 outputs a clock signal 560 to the component 538.

Additionally, in one embodiment, the error amplifier 524 also outputs a signal 570 to the component 568, which, in response, generates and sends a signal 572 to the component 534. In another embodiment, the component 534 receives both the signal 572 and the signal 528.

Figure 15:
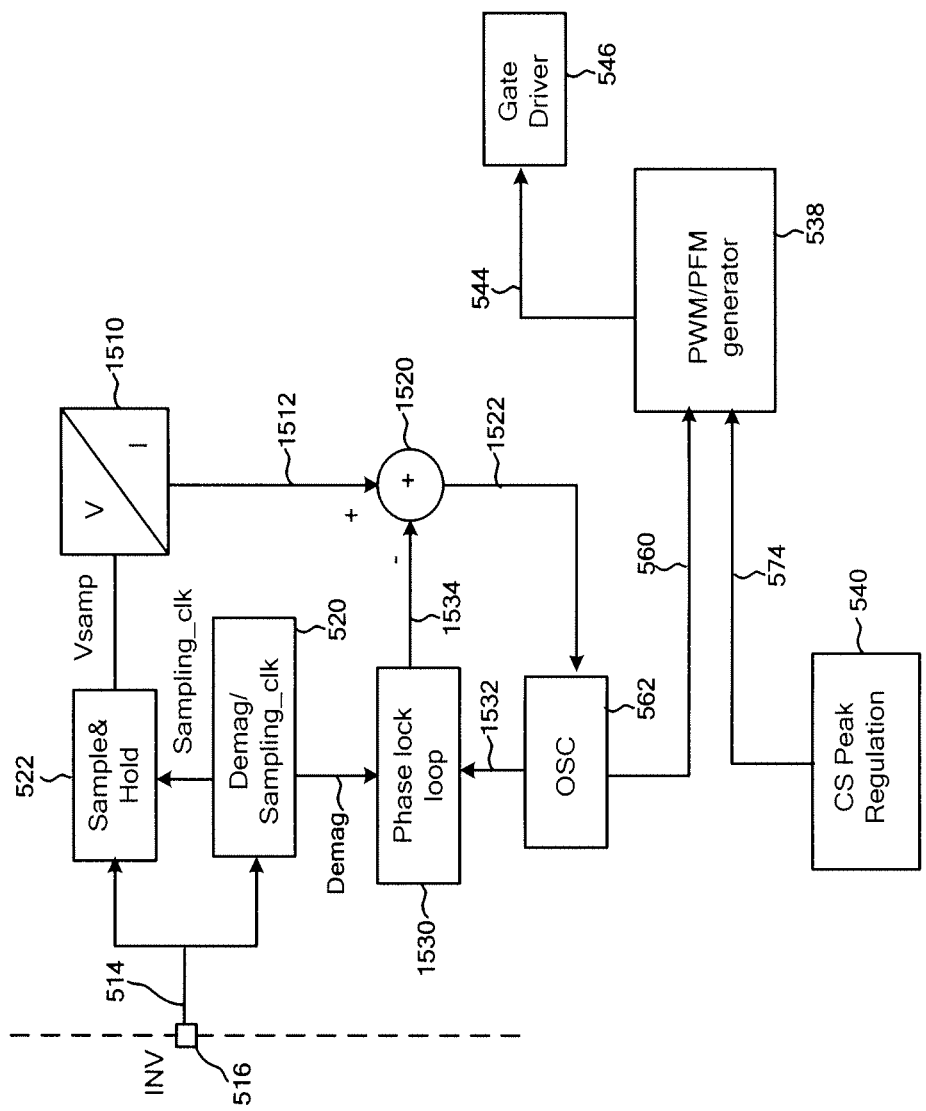
FIG. 15 is a simplified diagram showing certain devices for a component as a part of the switch-mode power conversion system according to an embodiment of the present invention.

As shown in FIG. 5, the component 520 also sends a Demag signal to the component 542, which also receives the signal $V_{samp}$. In response, the component 542 outputs a control signal 592. According to an embodiment, the control signal 592 is used to keep an output current $I_{out}$ constant in the constant current (CC) mode. For example, the component 542 includes one or more devices as shown in FIG. 15. In another example, the component 542, through the oscillator 562, locks the switching frequency according to the primary-winding inductance and thus compensates for the variations in primary-winding inductance. In yet another example, the output current $I_{out}$ in the constant current (CC) mode is made independent of primary-winding inductance.

According to one embodiment, the component 538 receives at least the signals 560, 536 and 592 and a signal 574 from the component 540. The component 540 receives Vth_oc in addition to a signal 564 from the terminal 566 (i.e., the terminal CS). For example, Vth_oc represents a predetermined threshold voltage level. In another example, the signal 564 is a voltage signal. In response, the component 538 outputs a control signal 544 to the component 546, which in turns sends a drive signal 548 to the switch 550. For example, the control signal 544 is a modulation signal. In another example, the switch is a power MOSFET. In yet another example, the switch is a power BJT. In yet another example, the switch is connected to the component 546 through the terminal 552 (i.e., the terminal Gate). In yet another example, the drive signal 548 is represented by $V_{Gate}$.

According to one embodiment, the control signal 544 is used to determine the turn-on time and the switching frequency for PWM/PFM control. For example, the larger magnitude of $V_{COMP}$ results in longer turn-on time and thus higher level of power delivered to the output. In another example, the larger magnitude of $V_{COMP}$ results in higher switching frequency and thus higher level of power delivered to the output. According to another embodiment, the turn-on time for PWM/PFM control is determined by the component 538, and the switching frequency for PWM/PFM control is determined by the oscillator 562.

As discussed above and further emphasized here, FIG. 5 is merely an example, which should not unduly limit the scope of the claims. One of ordinary skill in the art would recognize many variations, alternatives, and modifications. For example, the conversion system 500 includes one or more components that are not shown in FIG. 5. In another example, the conversion system 500 includes one or more connections that are not shown in FIG. 5. In yet another example, the conversion system 500 includes one or more components that are different from ones shown in FIG. 5. In yet another example, the conversion system 500 includes one or more connections that are different from ones shown in FIG. 5. In yet another example, the capacitor 526 can be replaced by another circuit for loop stabilization compensation.

FIG. 6 is a simplified timing diagram for signal sampling and holding as performed by the component 522 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 6, the waveform 610 represents $V_{Gate}$ as a function of time, the waveform 620 represents $V_{AUX}$ as a function of time, the waveform 630 represents $V_{INV}$ as a function of time, and the waveform 660 represents $V_{samp}$ as a function of time. Additionally, the waveform 640 represents the Sampling_clk signal as a function of time, and the waveform 650 represents the Holding_clk signal as a function of time.

Referring to FIG. 5, the signal $V_{Gate}$ as shown by the waveform 610 is sent to the switch 550. For example, after the switch 550 is turned off by $V_{Gate}$, the energy stored in the primary winding 502 is transferred to both the auxiliary winding 506 and the secondary winding 504 according to an embodiment of the present invention. In another example, the signal $V_{AUX}$ as shown by the waveform 620 resembles the signal 556 at the secondary winding 504. In one embodiment, the signal 556 reflects the output voltage $V_{out}$ near the end of each de-magnetization period. In yet another example, the signal $V_{INV}$ as shown by the waveform 630 resembles the signal $V_{AUX}$ as shown by the waveform 620 during each de-magnetization period.

Additionally, the waveform 640 shows that pulses of the Sampling_clk signal are generated at ends of de-magnetization periods according to an embodiment of the present invention. According to another embodiment, the waveform 650 shows that pulses of the Holding_clk signal are generated at ends of the de-magnetization periods.

As shown by the waveform 630, the signal $V_{INV}$ is sampled at the falling edges of the Sampling_clk signal and held during the rest of clock periods according to an embodiment. For example, the sampled and held values for the signal $V_{INV}$ is used to generate the signal $V_{samp}$. In another example, the signal amplitude $V_a$ reflects the output voltage of the component 522.

As discussed above and further emphasized here, FIG. 6 is merely an example, which should not unduly limit the scope of the claims. One of ordinary skill in the art would recognize many variations, alternatives, and modifications. For example, $V_a$ changes from one sampling clock period to another sampling clock period, so $V_{samp}$ also changes in magnitude from one sampling clock period to another sampling clock period.

Figure 7:
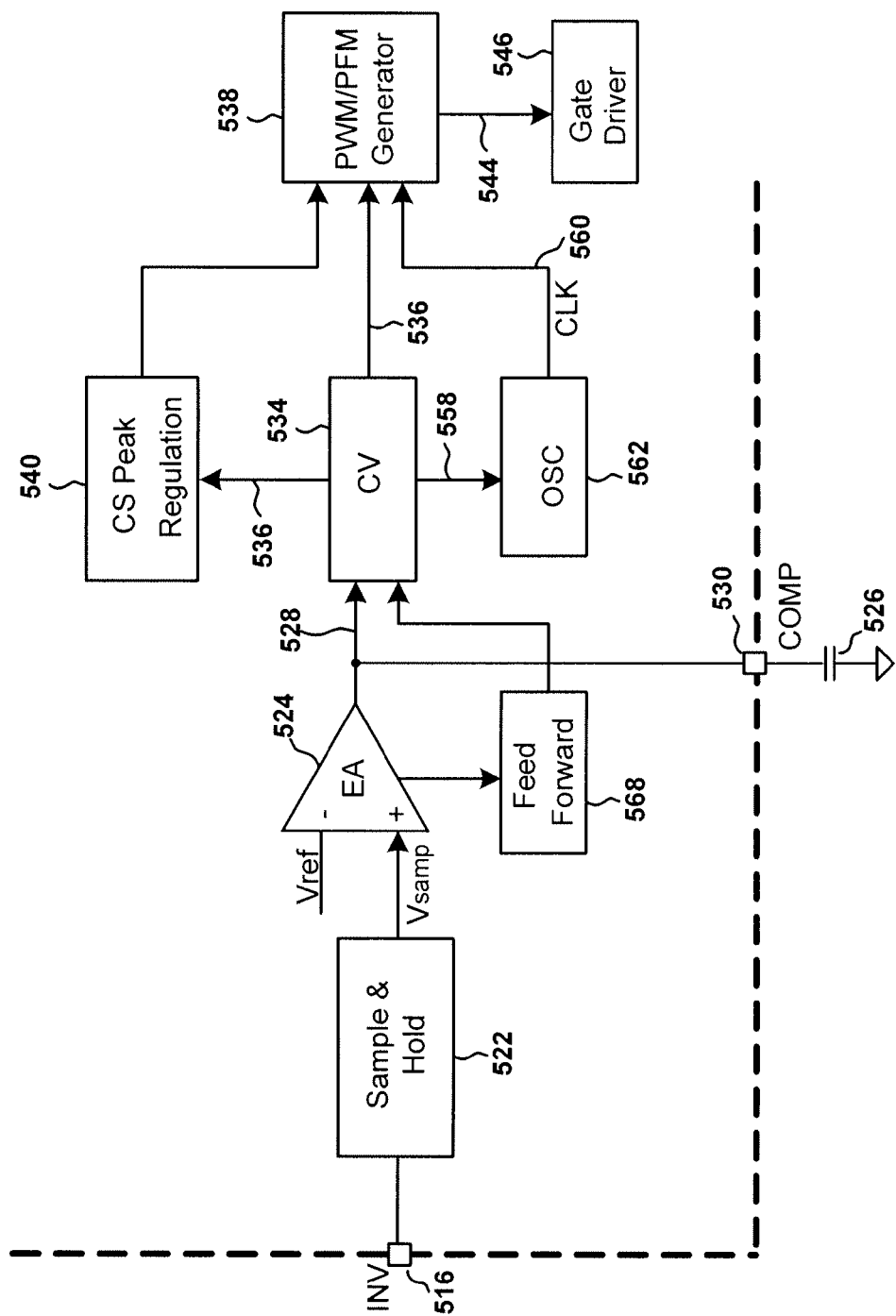
FIG. 7 is a simplified diagram showing certain components for output voltage regulation by the switch-mode power conversion system according to an embodiment of the present invention.

FIG. 7 is a simplified diagram showing certain components for output voltage regulation by the switch-mode power conversion system 500 according to an embodiment of the present invention. This diagram is merely an example, which should not unduly limit the scope of the claims. One of ordinary skill in the art would recognize many variations, alternatives, and modifications.

As shown in FIGS. 5 and 7, the voltage divider receives the signal 508 from the auxiliary winding 506, and outputs the signal 514 to the terminal INV according to an embodiment. In another embodiment, the signal 514 is load compensated by the component 532. The compensated signal 514 is fed into both the components 520 and 522.

For example, the component 522 samples the compensated signal 514 near the end of de-magnetization and hold the sampled signal until the next sampling. The sampled and held signal $V_{samp}$ is sent from the component 522 to the error amplifier 524, which also receives a reference signal $V_{ref}$. The signal $V_{samp}$ is compared with the reference signal $V_{ref}$, and their difference is amplified by the error amplifier 524.

In one embodiment, the error amplifier 524 generates an output signal 528 with the capacitor 526. For example, the capacitor 526 is connected to the error amplifier 524 through the terminal 530 (i.e., the terminal COMP). In another example, the output signal 528 (i.e., $V_{COMP}$) reflects the load condition and affects the PWM/PFM switching frequency and the PWM/PFM pulse width in order to regulate the output voltage $V_{out}$.

As shown in FIGS. 5 and 7, the output signal 528 (i.e., $V_{COMP}$) is sent to the component 534 according to an embodiment. For example, the component 534 sends a control signal 536 to the component 538 and a control signal 558 to the oscillator 562. In one embodiment, the control signal 558 is the current injected into the oscillator 562. In response, the oscillator 562 processes the control signal 558 in order to determine the frequency of the clock signal 560, and also outputs the clock signal 560 to the component 538. In another example, the component 538 receives both the signals 560 and 536, and outputs a control signal 544 to the component 546. The component 546 processes the control signal 544 in order to determine both the PWM/PFM switching frequency and the PWM/PFM pulse width. In one embodiment, the PWM/PFM pulse width is used to determine the current of the primary winding 502. The current of the primary winding 502 and the PWM/PFM switching frequency together are used to regulate the output voltage and maintain its constant magnitude in the CV mode.

According to one embodiment, if the magnitude of $V_{comp}$ is smaller than a predetermined value, the power conversion system 500 is in the CV mode. For example, if the voltage $V_{samp}$ is equal to $V_{ref}$ in magnitude, $V_{comp}$ is smaller than the predetermined value. In the CV mode, $V_{comp}$ is used to adjust the PWM/PFM switching frequency, and/or pulse width. For example, the PWM/PFM switching frequency and the PWM/PFM pulse width both are controlled in order to keep the output voltage $V_{out}$ constant.

According to another embodiment, if the magnitude of $V_{comp}$ exceeds the predetermined value, the power conversion system 500 is in the CC mode. For example, if the voltage $V_{samp}$ is lower than $V_{ref}$ in magnitude, $V_{comp}$ would exceed the predetermined value. In the CC mode, to regulate the output current $I_{out}$, the voltage $V_{samp}$ is used to control the switching frequency. For example, the PWM/PFM switching frequency is linearly proportional to $V_{samp}$, which in turn is proportional to the output voltage $V_{out}$.

As discussed above, referring to FIG. 5, the component 520 includes devices as shown in FIGS. 8 and 9 according to some embodiments of the present invention.

FIG. 8 is a simplified diagram showing certain devices for generating the Demag signal for the component 520 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIGS. 5 and 8, the signal $V_{INV}$ is received by the component 520 and is compared with two threshold voltages. One threshold voltage is $V_{th1}$, and the other threshold voltage is $V_{samp}$-$V_{th2}$. $V_{th1}$ and $V_{th2}$ are predetermined constants, and $V_{samp}$ is the previously sampled voltage received from the component 522. Based at least in part on the comparison between the signal $V_{INV}$ and the two threshold voltages, the Demag signal is generated. For example, the de-magnetization period is detected in order to generate the Demag signal.

FIG. 9 is a simplified diagram showing certain devices for generating the Sampling_clk signal for the component 520 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 8, the Demag signal is generated. Based at least in part on the Demag signal, other signals $P_{in1}$, $P_{in2}$, $S_{ync1}$, $S_{ync2}$, Samp1 and Samp2 are also generated as shown in FIG. 9. The duration information for the Demag signal is stored by integrators. For example, the integrators include switches and capacitors 910 and 920 (i.e., capacitors C1 and C2 respectively). In another example, the voltages for the capacitors C1 and C2 are $V_{C1}$ at the node 912 and $V_{C2}$ at the node 922, respectively.

In one embodiment, the switches are controlled by the signals $P_{in1}$ and $P_{in2}$. In another embodiment, the stored duration information for the Demag signal is used to determine the timing for the next pulse of the Sampling_clk signal. For example, the next pulse of the Sampling_clk signal appears right before the end of the de-magnetization period as shown in FIG. 6. Additionally, the width of the next pulse is determined by a one-shot device 930.

Figure 10:
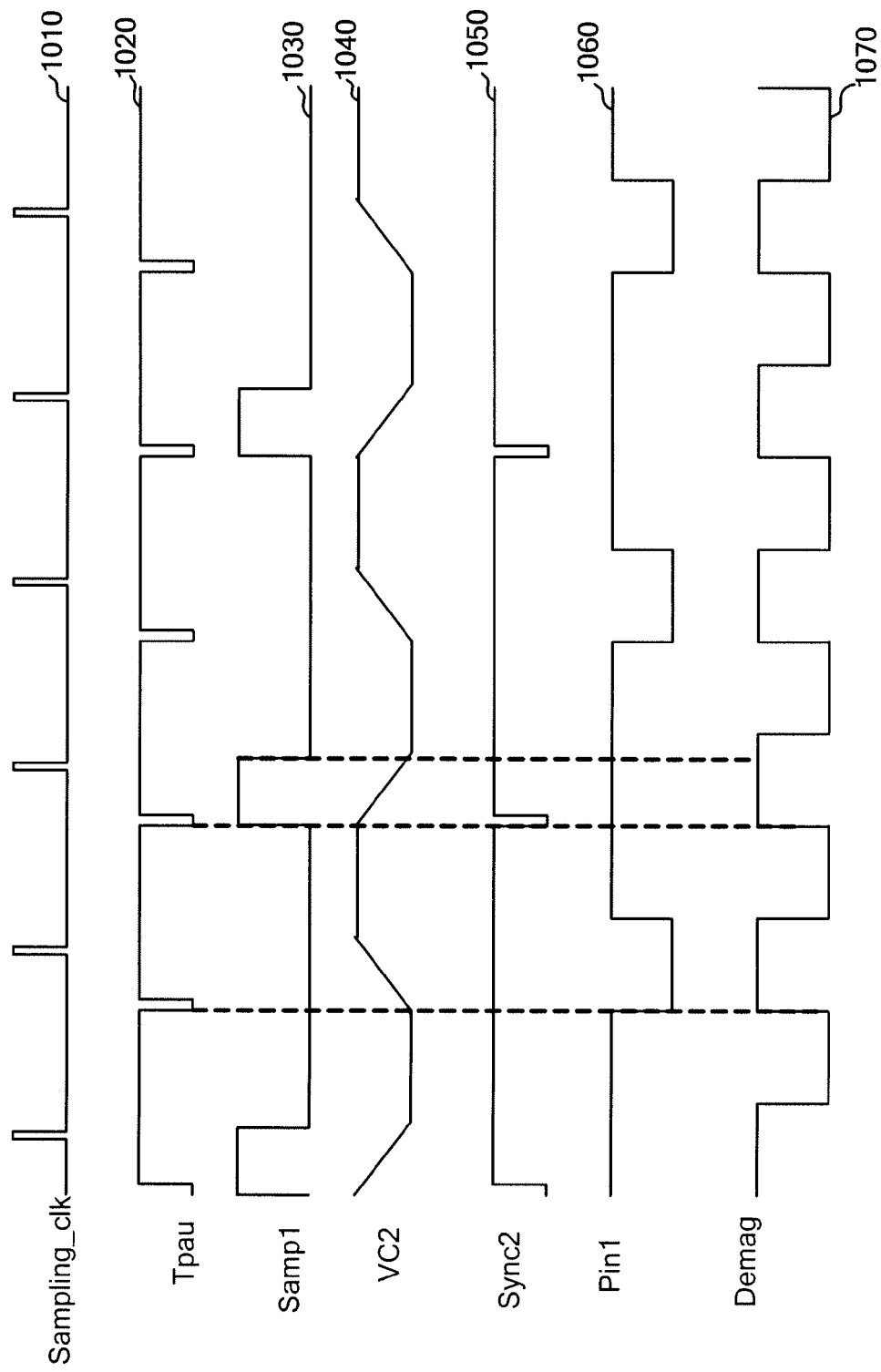
FIG. 10 is a simplified timing diagram for generating the Sampling_clk signal by a component as part of the switch-mode power conversion system according to an embodiment of the present invention.

FIG. 10 is a simplified timing diagram for generating the Sampling_clk signal by the component 520 as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 10, the waveform 1010 represents the Sampling_clk signal as a function of time, the waveform 1020 represents the Tpau signal as a function of time, and the waveform 1030 represents the Samp1 signal as a function of time. Additionally, the waveform 1040 represents $V_{C2}$ as a function of time. Also, the waveform 1050 represents the $S_{ync2}$ signal as a function of time, the waveform function 1060 represents the $P_{in1}$ signal as a func of time, and the waveform 1070 represents the Demag signal as a function of time. For example, the Sampling_clk signal, the Tpau signal, the Samp1 signal, the $S_{ync2}$ signal, the $P_{in1}$ signal, and the Demag signal According to one embodiment, the timing of the Sampling_clk signal is determined based on timing and duration of the Demag signal in the previous period, and the $P_{in1}$ and $P_{in2}$ signals are each generated based at least in part on duration of the Demag signal in the current period. For example, the duration of the Demag signal is the pulse width of the Demag signal as shown in FIG. 10. According to another embodiment, the Samp1 signal has the same pulse width as the Samp2 signal. For example, the pulse width is equal to the time interval between turning off the switch 550 and the next sampling. In another example, the Samp1 and Samp2 signals are used to determine the timing for the Sampling_clk signal.

In one embodiment, the relationship between the $P_{in1}$ signal and the Samp2 signal can be described by the difference equation below.

$$\beta P_{in1}(k-1) - \alpha * \text{Samp}_2(k-1) - A * \delta(k) = \text{Samp}_2(k) \quad (4)$$

where $P_{in1}$ represents the $P_{in1}$ signal, and $\text{Samp}_2$ represents the Samp2 signal. The relationship can be further described by the following Z-transform:

$$\beta P_{in1}(Z)Z^{-1} - \alpha * \text{Samp}_2(Z)Z^{-1} - A = \text{Samp}_2(Z) \quad (5)$$

and $$\text{Samp}_2(Z) = \frac{\beta * P_{in1}(Z)Z^{-1} - A}{1 + \alpha * Z^{-1}} \quad (6)$$

$$= \frac{\beta * P_{in1}(Z)Z^{-1}}{1 + \alpha * Z^{-1}} - \frac{A}{1 + \alpha * Z^{-1}}$$

where A is a constant initial value.
Additionally, the second term $$\frac{A}{1 + \alpha * Z^{-1}} \to 0 (\text{time} \to \infty);$$

therefore $$\text{Samp}_2 \approx \frac{\beta * P_{in1} Z^{-1}}{1 + \alpha * Z^{-1}} \quad (7)$$

From equation 7, it can be seen that the pulse width for the Samp2 signal is updated every cycle according to the duration of the Demag signal in the previous period.

Figure 11:
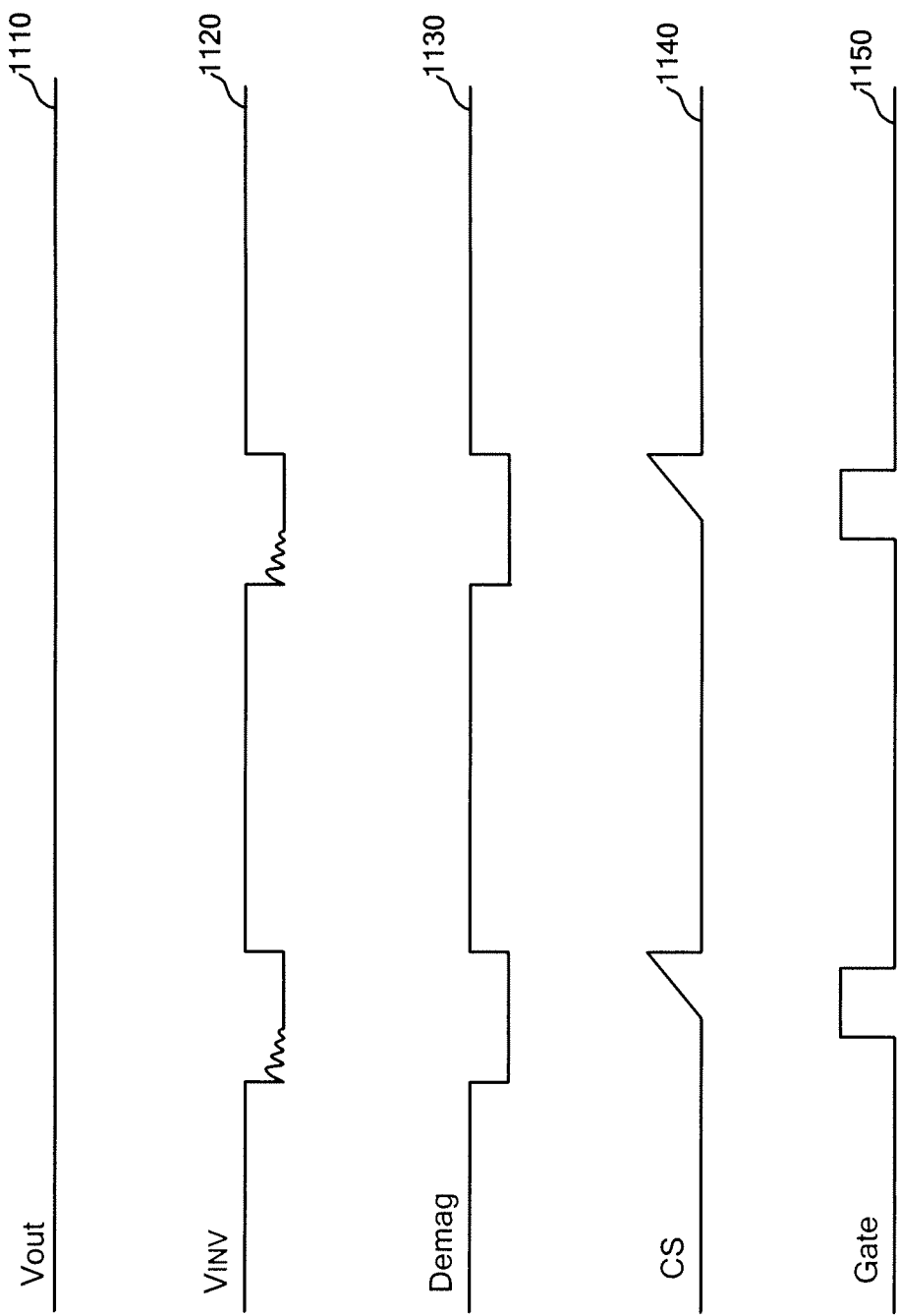
FIG. 11 is a simplified timing diagram for the switch-mode power conversion system according to another embodiment of the present invention.

FIG. 11 is a simplified timing diagram for the switch-mode power conversion system 500 according to another embodiment of the present invention. This diagram is merely an example, which should not unduly limit the scope of the claims. One of ordinary skill in the art would recognize many variations, alternatives, and modifications.

As shown in FIG. 11, the waveform 1110 represents $V_{out}$ as a function of time, the waveform 1120 represents $V_{INV}$ as a function of time, and the waveform 1130 represents the Demag signal as a function of time. Additionally, the waveform 1140 represents the voltage level for the signal 564 at the terminal CS as a function of time, and the waveform 1150 represents the signal 548 at the terminal Gate as a function of time.

As discussed above, referring to FIG. 5, the component 532 includes one or more devices as shown in FIGS. 12(a), 12(b), 13(a), and/or 13(b), and the component 524 includes some devices as shown in FIGS. 12(a), 12(b), 13(a), and/or 13(b) according to certain embodiments of the present invention.

FIG. 12(a) is a simplified diagram showing certain devices for the component 532 and the error amplifier 524 as parts of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 12(a), the component 532 includes a current source 1230, and the error amplifier 524 includes a component 1210 and a transconductance amplifier 1220. For example, the component 1210 determines the difference between two input signals in magnitude.

For example, the component 1210 receives the voltage signal $V_{samp}$ and the reference signal $V_{ref}$ and generates the signal 570 whose magnitude is equal to $V_{ref}$-$V_{samp}$. In another example, the transconductance amplifier 1220 amplifies the signal 570 to generate the output signal 528. According to one embodiment, the output signal 528 is received by the capacitor 526. For example, the capacitor 526 serves as a low-pass filter for the closed loop. Additionally, the component 568 as a part of a feed forward path provides a zero to the closed loop in order to improve operation stability of the conversion system 500.

The current source 1230 generates a current I_COMPEN_P that varies with the output loading. The current I_COMPEN_P flows through the terminal INV and the resistor 512. For example, the current I_COMPEN_P is used to compensate for voltage drop from the cable and other voltage loss that vary with the output current $I_{out}$. In another example, the I_COMPEN_P current reaches its maximum at no load condition, and becomes zero at full load condition.

According to one embodiment, with load compensation, the output voltage $V_{out}$ can be expressed as follows.

$$V_{out} = k \cdot V_{Ref} + \frac{1}{n} V_{D1} - k \cdot \text{I\_COMPEN\_P} \cdot (R_1 // R_2) \quad (8)$$

where n is the ratio of turns between the auxiliary winding 506 and the secondary winding 504. Additionally, $V_{D1}$ is the forward diode drop voltage for the diode 554, and $$k = \frac{R_1 + R_2}{n \cdot R_2} \quad (9)$$

For example, the last term in equation 8 represents a compensation factor for canceling the voltage drop from the cable.

FIG. 12(b) is a simplified diagram showing certain devices for the current source 1230 as part of the component 532 in the switch-mode power conversion system 500 according to an embodiment of the present invention. This diagram is merely an example, which should not unduly limit the scope of the claims. One of ordinary skill in the art would recognize many variations, alternatives, and modifications.

Referring to FIG. 12(a), the component 532 includes the current source 1230. As shown in FIG. 12(b), the current source 1230 includes a voltage-to-current converter 1240, a constant current source 1250, and a component 1260. For example, the component 1260 determines the difference between two input signals in magnitude.

For example, the signal 528 (i.e., $V_{COMP}$) is received by the voltage-to-current converter 1240 and converted into a current I_COMPEN. In another example, the constant current source 1250 generates a constant current Icc. Both the currents Icc and I_COMPEN are received by the component 1260, which generates the current I_COMPEN_P. In one embodiment, the current I_COMPEN_P is equal to Icc—I_COMPEN. In another embodiment, if $V_{COMP}$ becomes larger, the current I_COMPEN_P becomes smaller.

FIG. 13(a) is a simplified diagram showing certain devices for the component 532 and the error amplifier 524 as parts of the switch-mode power conversion system 500 according to another embodiment of the present invention. This diagram is merely an example, which should not unduly limit the scope of the claims. One of ordinary skill in the art would recognize many variations, alternatives, and modifications.

As shown in FIG. 13(a), the component 532 includes a current sink 1330, and the error amplifier 524 includes a component 1310 and a transconductance amplifier 1320. For example, the component 1310 determines the difference between two input signals in magnitude.

For example, the component 1310 receives the voltage signal $V_{samp}$ and the reference signal $V_{ref}$ and generates the signal 570 whose magnitude is equal to $V_{ref}$-$V_{samp}$. In another example, the transconductance amplifier 1320 amplifies the signal 570 and generates the output signal 528. According to one embodiment, the output signal 528 is received by the capacitor 526. For example, the capacitor 526 serves as a low-pass filter for the closed loop. Additionally, the component 568 as a part of a feed forward path provides a zero to the closed loop in order to improve operation stability of the conversion system 500.

The current sink 1330 generates a current I_COMPEN_N that varies with the output loading. The current I_COMPEN_N flows from the resistor 510 and the terminal INV. For example, the current I_COMPEN_N is used to compensate for voltage drop from the cable and other voltage loss that vary with the output current $I_{out}$. In another example, the I_COMPEN$_N$ current reaches its maximum at full load condition, and becomes zero at no load condition.

FIG. 13(b) is a simplified diagram showing certain devices for the current sink 1330 as part of the component 532 in the switch-mode power conversion system 500 according to an embodiment of the present invention. This diagram is merely an example, which should not unduly limit the scope of the claims. One of ordinary skill in the art would recognize many variations, alternatives, and modifications.

Referring to FIG. 13(a), the component 532 includes the current sink 1330. As shown in FIG. 13(b), the current sink 1330 includes a voltage-to-current converter 1340 and a current mirror including transistors 1350 and 1360. For example, the signal 528 (i.e., $V_{COMP}$) is received by the voltage-to-current converter 1340 and converted into a current I_COMPEN. In another example, the current I_COMPEN is received by the current mirror, which generates the current I_COMPEN_N. In one embodiment, the current I_COMPEN_N is equal to m×I_COMPEN, and m is a positive integer. In another embodiment, if $V_{COMP}$ becomes larger, the current I_COMPEN_N also becomes larger.

Figure 14:
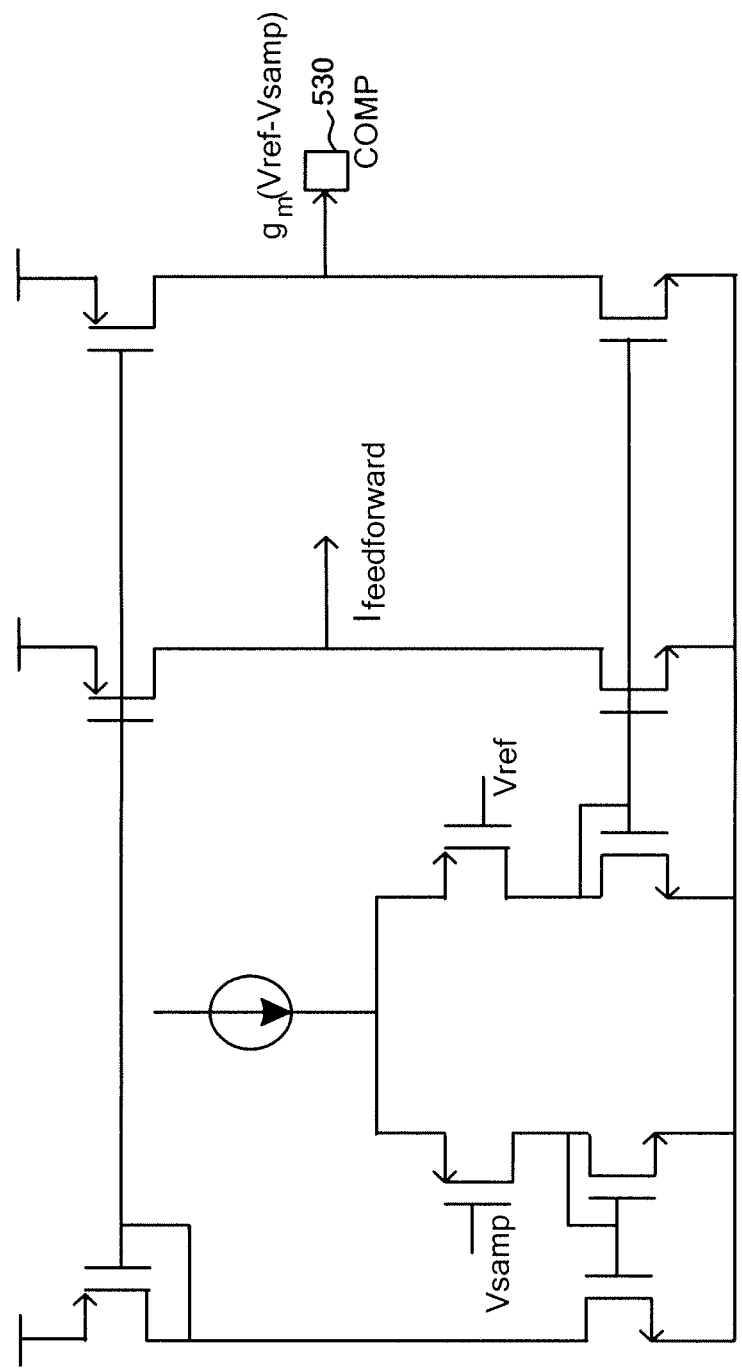
FIG. 14 is a simplified diagram showing CMOS implementation of a component and an error amplifier as parts of the switch-mode power conversion system according to an embodiment of the present invention.

FIG. 14 is a simplified diagram showing CMOS implementation of the component 568 and the error amplifier 524 as parts of the switch-mode power conversion system 500 according to an embodiment of the present invention. This diagram is merely an example, which should not unduly limit the scope of the claims. One of ordinary skill in the art would recognize many variations, alternatives, and modifications.

FIG. 15 is a simplified diagram showing certain devices for the component 542 as a part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 15, the component 542 includes a voltage-to-current converter 1510, a component 1520, and a phase-lock loop 1530. For example, the component 1520 determines the difference between two input signals in magnitude. In another example, the component 1520 receives a signal 1512 from the voltage-to-current converter 1510 and a signal 1534 from the phase-lock loop 1530, and outputs a signal 1522 representing the difference between the signal 1512 and the signal 1534 in magnitude.

As shown in FIGS. 5 and 15, the component 522 samples the signal 514 and generates the signal $V_{samp}$. Additionally, the Demag signal is generated by the component 520. In one embodiment, the duration of the Demag signal is proportional to the current of the primary winding 502 and also to the current of the secondary winding 504. For example, the duration of the Demag signal is the pulse width of the Demag signal as shown in FIG. 10.

In one embodiment, if the signal $V_{samp}$ is smaller than the signal $V_{ref}$ in magnitude, the magnitude of $V_{comp}$ exceeds the predetermined value, and the power conversion system 500 is in the CC mode. For example, the magnitude of $V_{comp}$ reaches its maximum, and the CC mode is detected. In another embodiment, in CC mode, the PWM/PFM switching frequency is controlled by the voltage $V_{samp}$. For example, the PWM/PFM switching frequency is linearly proportional to $V_{samp}$, which in turn is proportional to the output voltage $V_{out}$.

For example, in CC mode, $V_{out}$ under discontinuous conduction mode (DCM) is given by the following equation:

$$Po = Vo * Io = \frac{1}{2}\eta L_P F_{SW} I_P^2 \quad (10)$$

where Po represents the output power of the conversion system 500. Additionally, Vo and Io represent the output voltage $V_{out}$ and the output current $I_{out}$ respectively. Moreover, Lp represents the inductance of the primary winding 502, Fsw represents the switching frequency, and Ip represents the peak current of the primary winding 502. η is constant.

If Fsw is proportional to $V_{samp}$, Fsw is also proportional to Vo as follows.

$$F_{SW} = \epsilon Vo$$

where ε is constant. Combining equations 10 and 11, then $$Io = \frac{1}{2}\eta L_P \frac{F_{SW}}{Vo} I_P^2 = \frac{1}{2}\eta L_P \epsilon I_P^2 \quad (12)$$

Since η and ε are constants, the output current Io is constant if Ip and Lp both are precisely controlled. But if Lp is not precisely controlled, Io may change even in the CC mode.

$$L_P \frac{F_{SW}}{Vo} = \alpha \quad (13)$$

Alternatively, if $$Io = \frac{1}{2}\eta \alpha I_P^2 \quad (14)$$

where α is constant, then

Hence Io can be made constant if Ip is precisely controlled and if equation 13 is satisfied.

Additionally, for flyback operation, according to an embodiment, the demagnetization duration can be determined by inductance Ls of the secondary winding 504, the peak current $I_{P\_sec}$ of the secondary winding 504, and the output voltage Vo as follows. For example, the demagnetization duration is the same as the duration of the Demag signal, such as the pulse width of the Demag signal as shown in FIG. 10.

$$T_{Demag} = \frac{Ls \cdot I_{P\_sec}}{Vo} \quad (15)$$

Since Ls is proportional to Lp and $I_{p\_sec}$ is proportional to Ip, $$T_{Demag} = \beta \frac{Lp \times I_P}{Vo} \quad (16)$$

where β is a constant. If equation 13 is satisfied, then $$T_{Demag} \times F_{SW} = \beta \frac{Lp \times I_P}{Vo} \times F_{SW} = \alpha \beta I_P \quad (17)$$

Hence, if Ip is precisely controlled, $$T_{Demag} \times F_{SW} = \gamma \quad (18)$$
and
$$I_P = \frac{\gamma}{\alpha \beta} \quad (19)$$

where γ is constant. Combining equations 14 and 19, $$Io = \frac{1}{2\beta} \eta \gamma I_P \quad (20)$$

According to an embodiment, as shown in FIGS. 5 and 15, in the CC mode, the PWM/PFM switching frequency is locked by the phase locked loop 1530.

For example, $$F_{SW} = \frac{\gamma}{T_{Demag}} \quad (21)$$
and
$$Io \propto \gamma I_P \quad (22)$$

According to another embodiment, by adjusting $F_{sw}$ based on $T_{Demag}$ according to equation 21, γ remains constant. For example, γ is a constant equal to or larger than 0.25 and equal to or smaller than 0.75. Hence, the output current Io is kept constant, so long as $I_p$, in addition to γ, is also controlled to be constant, according to equation 22.

For example, the component 542 locks the switching frequency $F_{sw}$ according to inductance of the primary winding 502 and thus compensates for the variations in the primary-winding inductance. In yet another example, the output current $I_{out}$ in the constant current (CC) mode is made independent of primary-winding inductance. As shown in FIGS. 5 and 15, the oscillator 562 receives the signal 1522 from the component 1520 as part of the component 542, and also sends a clock signal 1532 to the phase-lock loop 1530 as part of the component 542, according to an embodiment.

Figure 16:
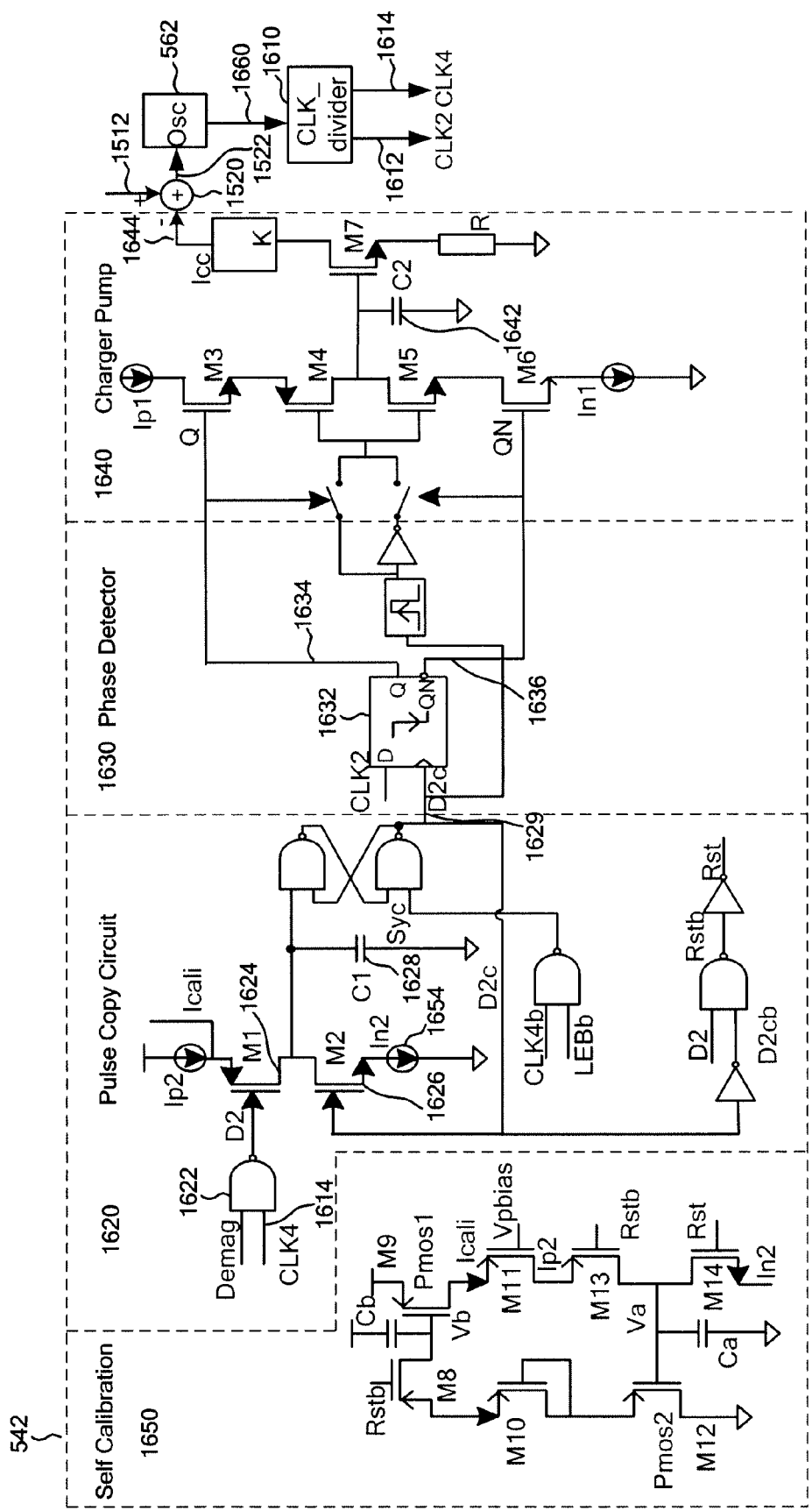
FIG. 16 is a simplified diagram showing certain devices for a component for constant output current (CC) control as part of the switch-mode power conversion system according to an embodiment of the present invention.

FIG. 16 is a simplified diagram showing certain devices for the component 542 for constant output current (CC) control as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 16, the component 542 includes a pulse copy circuit 1620, a phase detector 1630, a charge pump 1640, and a self calibration circuit 1650. In one embodiment, the pulse copy circuit 1620 receives the Demag signal from the component 520 and a clock signal 1614 from a clock divider 1610, and generates a signal 1629. The clock signal 1614 is represented by CLK4, and the signal 1629 is represented by D2C. For example, the signal D2C is a copy of the Demag signal but synchronized with the clock signal CLK4.

In another embodiment, the pulse copy circuit 1620 includes a NAND gate 1622, MOS transistors 1624 and 1626, and a capacitor 1628. For example, the NAND gate 1622 receives the Demag signal and the clock signal 1614, and generates a voltage signal D2. As shown in FIG. 16, the voltage signal D2 controls the MOS transistor 1622. For example, if the signal D2 is at a logic low level, the MOS transistor 1622 charges the capacitor 1628 with a current $I_{p2}$. In another example, if the signal D2 is at a logic high level, the MOS transistor 1624 discharges the capacitor 1628 with a current $I_{n2}$. According to one embodiment, immediately prior to such discharge, the voltage of the capacitor 1628 reflects the pulse width at the low voltage level for the signal D2. According to another embodiment, the current $I_{p2}$ is equal to the current $I_{n2}$. For example, the pulse width at the low voltage level for the signal D2 is the same as the pulse width at the high voltage level for the signal D2C. In another example, the rising edge of the signal D2C is synchronized with the falling edge of the clock signal 1614. In yet another example, the rising edge of the signal D2C is synchronized with the falling edge of a clock signal 1612, which is represented by CLK2.

Figure 17:
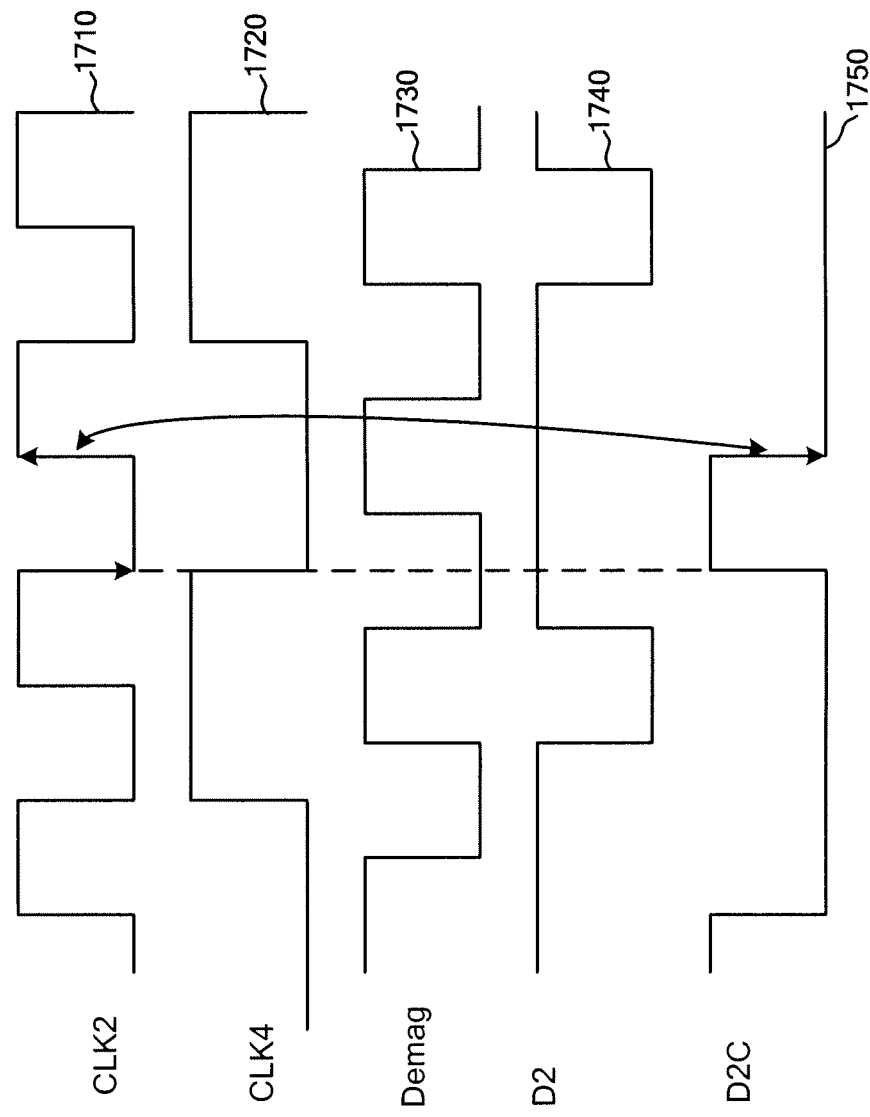
FIG. 17 is a simplified timing diagram for generating the D2C signal by a pulse copy circuit as part of the switch-mode power conversion system according to an embodiment of the present invention.

FIG. 17 is a simplified timing diagram for generating the D2C signal by the pulse copy circuit 1620 as part of the switch-mode power conversion system 500 according to an embodiment of the present invention. This diagram is merely an example, which should not unduly limit the scope of the claims. One of ordinary skill in the art would recognize many variations, alternatives, and modifications.

The waveform 1710 represents the clock signal CLK2 as a function of time, the waveform 1720 represents the clock signal CLK4 as a function of time, and the waveform 1730 represents the Demag signal as a function of time. Additionally, the waveform 1740 represents the D2 signal as a function of time, and the waveform 1750 represents the D2C signal as a function of time.

As shown in FIG. 17, as the result, the rising edge of the D2C signal is synchronized with the falling edge of the clock signal CLK2 and the falling edge of the clock signal CLK4. Also, as shown in FIG. 17, the pulse width at the high voltage level for the Demag signal is the same as the pulse width at the high voltage level for the D2C signal.

Returning to FIG. 16, the signal 1629 is outputted from the pulse copy circuit 1620 to the phase detector 1630. The phase detector 1630 includes a D flip-flop 1632. For example, the D flip-flop 1632 compares the pulse width at the high voltage level for the D2C signal and the pulse width at the low voltage level for the clock signal CLK2.

In one embodiment, if the pulse width at the high voltage level for the D2C signal is larger than the pulse width at the low voltage level for the clock signal CLK2, a signal 1634 at the Q terminal is at the high voltage level and a signal 1636 at the QN terminal is at the low voltage level. In another embodiment, if the pulse width at the high voltage level for the D2C signal is smaller than the pulse width at the low voltage level for the clock signal CLK2, the signal 1634 at the Q terminal is at the low voltage level and the signal 1636 at the QN terminal is at the high voltage level.

As shown in FIG. 16, the signals 1634 and 1636 are received by the charge pump 1640. The charge pump 1640 includes a capacitor 1642. For example, the capacitor 1642 is charged or discharged in response to the signals 1634 and 1636. In another example, the charge and discharge of the capacitor 1642 is used to regulate a current signal 1644, which is represented by $I_{cc}$.

According to an embodiment, the current signal 1644 is received by the oscillator 562, which generates a clock signal 1660. For example, the current signal 1644 is used to regulate the bias current of the oscillator 562 in order to regulate the frequency of the clock signal 1660.

As discussed above and further emphasized here, FIG. 5 is merely an example, which should not unduly limit the scope of the claims. One of ordinary skill in the art would recognize many variations, alternatives, and modifications. For example, as shown in FIG. 16, the conversion system 500 includes a clock divider 1610, which receives the clock signal 1660 and generates the clock signals 1612 and 1614.

According to one embodiment, the frequency of the clock signal 1612 is half of the frequency of the clock signal 1660. According to another embodiment, the frequency of the clock signal 1612 is twice as much as the frequency of the clock signal 1614. For example, as shown in FIG. 17, the falling edge of the clock signal 1614 (i.e., the clock signal CLK4) is synchronized with the falling edge of the clock signal 1612 (i.e., the clock signal CLK2).

Returning to FIG. 16, the clock signals 1612 and 1614 are outputted to the component 542 for constant current (CC) control. For example, the clock signal 1532 as shown in FIG. 15 represents the clock signals 1612 and 1614. In another example, even though FIGS. 5 and 15 do not explicitly show the clock divider 1610, the clock divider 1610 is a part of the conversion system 500 according to an embodiment.

In response, the component 542 generates the current signal 1644, which is received by the oscillator 562. For example, the current signal 1644 is the signal 1534 as shown in FIG. 15. According to one embodiment, the oscillator 562, the clock divider 1610, and the component 542 forms a loop.

For example, the loop has a sufficiently high gain. In another example, after the loop becomes stable, the period of the clock signal 1612 is locked at twice as long as the pulse width at the high voltage level for the Demag signal. In one embodiment, the pulse width at the high voltage level for the Demag signal is the same as the pulse width at the high voltage level for the clock signal 1612 (i.e., the clock signal CLK2), as shown in FIG. 17. In another embodiment, the period for the clock signal 1612 is equal to a constant multiplied by the pulse width at the high voltage level for the Demag signal. For example, the constant is equal to $1/\gamma$.

Also as shown in FIG. 17 and discussed above, the pulse width at the high voltage level for the Demag signal is the same as the pulse width at the high voltage level for the D2C signal according to an embodiment of the present invention. Hence, for example, the pulse width at the high voltage level for the D2C signal is the same as the pulse width at the high voltage level for the clock signal CLK2.

Again returning to FIG. 16, the self calibration circuit 1650 is configured to calibrate the magnitude of the current $I_{p2}$ and the magnitude of the current $I_n$. For example, the magnitude of the current $I_{p2}$ is equal to the magnitude of the current $I_n$.

According to one embodiment, as shown in FIG. 16, the Demag signal and the clock signal CLK4 are fed into the loop that includes the oscillator 562, the clock divider 1610, and the component 542. The loop adjusts the frequency of the clock signal CLK2 such that the frequency of the clock signal CLK2 is locked to the frequency of the Demag signal. For example, the frequency of the clock signal CLK2 is equal to the switching frequency of the drive signal 548, as shown in Equation 21.

As discussed above, in one embodiment, the output current $I_{out}$ is determined by the peak current $I_p$ of the primary winding 502 when the switch 550 turns off. But the peak current $I_p$ may change with an AC input voltage (e.g., VAC in FIG. 5) due to the propagation delay of the control circuit. For example, the higher AC input voltage results in the higher peak current $I_p$ and vice versa. Therefore, the peak current $I_p$ should be precisely controlled at a constant level regardless of the input AC voltage according to one embodiment.

Figure 18:
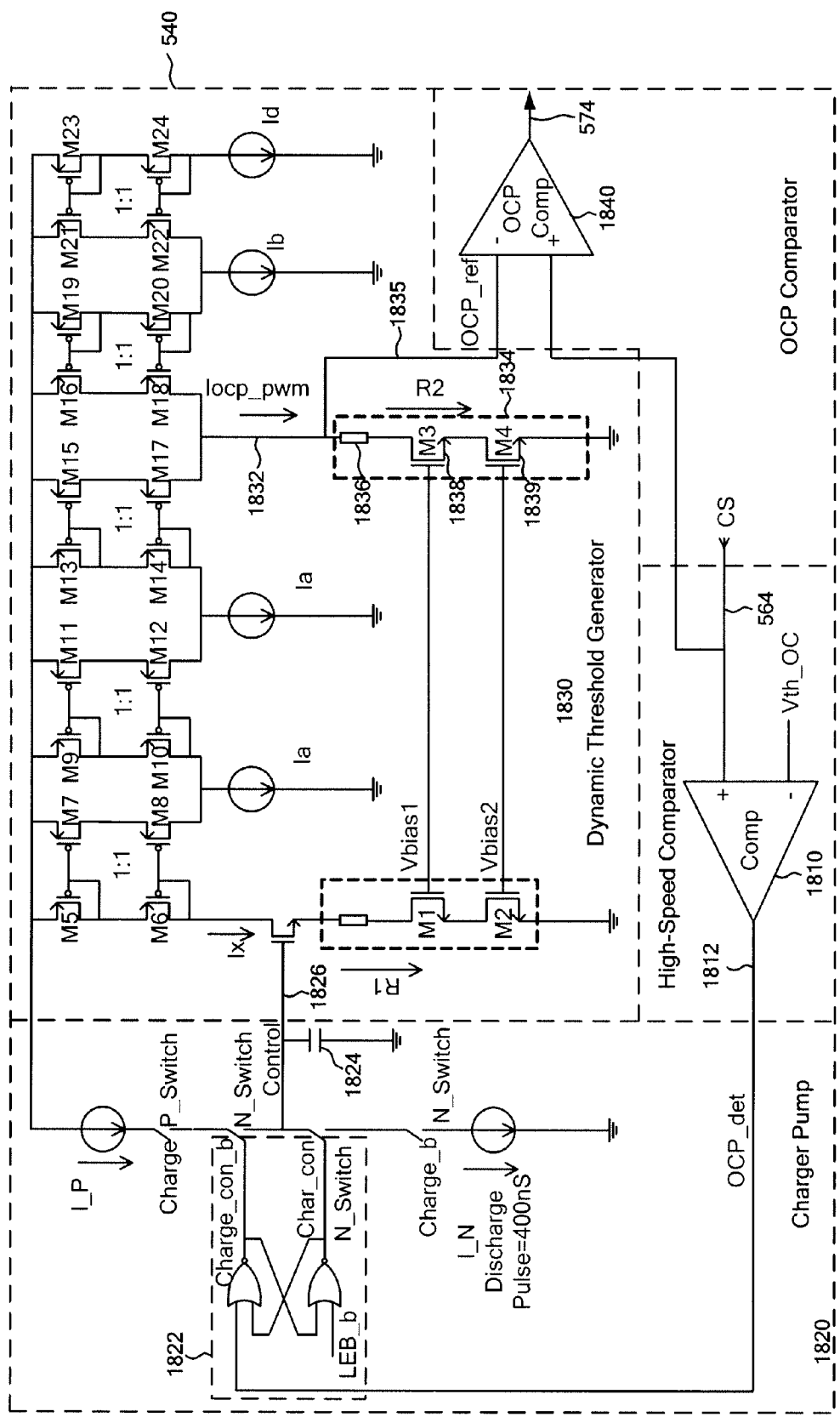
FIG. 18 is a simplified diagram showing certain devices for a component for current sensing (CS) peak regulation as part of the switch-mode power conversion system 500 according to an embodiment of the present invention.

FIG. 18 is a simplified diagram showing certain devices for the component 540 for current sensing (CS) peak regulation as part of the switch-mode power conversion system 500 according to an embodiment of the present invention. This diagram is merely an example, which should not unduly limit the scope of the claims. One of ordinary skill in the art would recognize many variations, alternatives, and modifications.

As shown in FIG. 18, the component 540 includes a high-speed comparator 1810, a charge pump 1820, a dynamic threshold generator 1830, and an over-current-protection (OCP) comparator 1840.

In one embodiment, the high-speed comparator 1810 receives Vth_oc in addition to the signal 564 from the terminal 566 (i.e., the terminal CS). For example, the current that flows through the primary winding 502 is sensed by the resistor 580, whose resistance is represented by Rs. As shown in FIG. 5, a current 582, whose magnitude is represented by Is, flows through the resistor 580, and in response, the resistor 580 generates the voltage signal 564, whose magnitude is represented by Vcs. In another example, at the time when the switch 550 is just being turned off, Vcs is compared with Vth_oc.

In another embodiment, the high-speed comparator 1810 compares Vth_oc with the signal 564, and generates a comparison signal 1812. The comparison signal 1812 is represented by OCP_det. For example, the comparison signal 1812 is received by the charge pump 1820. In another example, the charge pump 1820 includes an RS latch 1822 and a capacitor 1824. In one embodiment, the RS latch 1822 receives the comparison signal 1812 and in response controls charging and discharging of the capacitor 1824. In another embodiment, the capacitor 1824 provides a voltage signal 1826, which is received by the dynamic threshold generator 1830.

In yet another embodiment, the dynamic threshold generator 1830 converts the voltage signal 1826 into a current signal. For example, the converted current signal is processed by current mirrors, which generate a dynamic current signal 1832. The dynamic current signal 1832 is represented by Iocp_PWM. In another example, the current signal 1832 is received by a dynamic resistor 1834, which is represented by R2. In one embodiment, the dynamic resistor 1834 includes a linear resistor 1836 and transistors 1838 and 1839. For example, the transistors 1838 and 1839 provide temperature-related resistance compensation.

In another embodiment, the dynamic resistor 1834 converts the current signal 1832 into a voltage signal 1835. The voltage signal 1835 is represented by OCP_ref. For example, if Vth_oc is smaller than the voltage signal 564 in magnitude, the voltage signal 1835 would be adjusted lower by the dynamic threshold generator 1830. In another example, if Vth_oc is larger than the voltage signal 564 in magnitude, the voltage signal 1835 would be adjusted higher by the dynamic threshold generator 1830.

As shown in FIG. 18, the voltage signal 1835 is received by the over-current-protection (OCP) comparator 1840. The OCP comparator 1840 also receives the signal 564 from the terminal 566 (i.e., the terminal CS). For example, the OCP comparator 1840 compares OCP_ref with the signal 564, and generates the signal 574. In another example, the signal 574 is received by the component 538 in order to regulate the peak current of the primary winding 502.

As discussed above, the signal 564 is, for example, compared with Vth_OC by the high-speed comparator 1810, and compared with OCP_ref by the OCP comparator 1840. In one embodiment, the high-speed comparator 1810, the charge pump 1820, the dynamic threshold generator 1830, the OCP comparator 1840, and others form a loop with a high gain. In another embodiment, even if the change in line voltage causes the change of slope for the signal 564, the peak current of the primary winding 502 is maintained at a constant level. In yet another embodiment, even if the propagation delay for the PWM/PFM signal changes, the peak current of the primary winding 502 is maintained at a constant level.

According to yet another embodiment, as shown in FIG. 18, the comparison signal 1812 is used to control the charge pump 1820 in order to adjust the voltage signal 1835 that is represented by OCP_ref. For example, the voltage signal 1835 serves as the threshold voltage of the OCP comparator 1840. As a result, the peak current of the primary winding 502 is regulated by an internal loop such that the peak current equals to $$\frac{Vth\_oc}{Rs},$$

regardless of the magnitude of the line voltage, according to certain embodiments of the present invention. Therefore, based on equation 20, the constant output current is, for example, as follows.

$$Io = \frac{1}{2\beta}\eta\gamma\frac{Vth\_oc}{Rs} \quad (23)$$

In another example, the output voltage Vo is controlled by regulating the output signal 514 that is represented by $V_{INV}$. Therefore, the constant voltage Vo and the constant current Io can be obtained in the CV mode and the CC mode respectively, according to some embodiments of the present invention. For example, the CC mode is applicable for charging a battery until the voltage of the battery reaches the predetermined magnitude.

According to another embodiment, a system (e.g., as shown in FIG. 5) for regulating a power converter includes a first signal generator (e.g., as shown by the component 520) configured to receive at least an input signal and generate at least a first output signal associated with demagnetization and a second output signal associated with sampling. Additionally, the system includes a sampling component (e.g., as shown by the component 522) configured to receive at least the input signal and the second output signal, sample the input signal based on at least information associated with the second output signal, and generate at least a third output signal associated with one or more sampled magnitudes. Moreover, the system includes an error amplifier (e.g., as shown by the component 524) configured to receive at least the third output signal and a first threshold voltage and generate at least a fourth output signal with a capacitor, the capacitor being coupled to the error amplifier. Also, the system includes a compensation component (e.g., as shown by the component 532) configured to receive at least the fourth output signal and generate at least a compensation signal. The input signal is a combination of the compensation signal and a first sensed signal. The first sensed signal is associated with a first winding coupled to a secondary winding for a power converter, and the secondary winding is related to an output current and an output voltage for the power converter. Additionally, the system includes the first controller (e.g., as shown by the component 542) for regulating at least the output current. For example, the first controller is configured to receive at least the first output signal and the third output signal and generate at least a first control signal based on at least information associated with the first output signal and the third output signal. Moreover, the system includes a second controller (e.g., as shown by the component 534) for regulating at least the output voltage. For example, the second controller being configured to receive at least the fourth output signal and generate at least a second control signal (e.g., as shown by the signal 558) and a third control signal (e.g., as shown by the signal 536) based on at least information associated with the fourth output signal. Also, the system includes an oscillator (e.g., as shown by the component 562) configured to receive at least the first control signal and the second control signal and generate at least a clock signal, and a second signal generator (e.g., as shown by the component 538) configured to receive at least the clock signal, the third control signal, and a fourth control signal, and generate at least a modulation signal. Additionally, the system includes a gate driver (e.g., as shown by the component 546) configured to receive at least the modulation signal and output at least a drive signal to a switch. For example, the switch is configured to affect a first current flowing through a primary winding coupled to the secondary winding. Moreover, the system includes a third controller (e.g., as shown by the component 540) for regulating at least a peak current. For example, the third controller being configured to receive the third control signal, a second sensed signal, and a second threshold voltage, and output the fourth control signal to the second signal generator. In another example, the second sensed signal is associated with the first current flowing through the primary winding for the power converter.

For example, the system further includes a feed forward component (e.g., as shown by the component 568) configured to receive a fifth output signal from the error amplifier (e.g., as shown by the component 524) and output a sixth output signal to the second controller (e.g., as shown by the component 534). In another example, the system is configured to regulate the output current to a constant current level if the fourth output signal is larger than a predetermined value in magnitude and regulate the output voltage to a constant voltage level if the fourth output signal is smaller than the predetermined value in magnitude. In yet another example, the sampling component (e.g., as shown by the component 522) is further configured to perform at least one sampling process for the input signal at or near an end of a demagnetization period, generate a first sampled magnitude, and hold the first sampled magnitude until a second sampled magnitude is generated, the first sampled magnitude and the second sampled magnitude being two of the one or more sampled magnitudes. In yet another example, the first signal generator (e.g., as shown by the component 520 and as shown by FIGS. 5 and 8) is further configured to receive the third output signal, determine a third threshold voltage based on at least information associated with the third output signal, compare the third threshold voltage and the input signal in magnitude, and generate the first output signal based on at least information associated with the third threshold voltage and the input signal.

According to yet another embodiment, a system (e.g., as shown by FIGS. 5 and 7) for regulating a power converter includes a sampling component (e.g., as shown by the component 522) configured to receive at least an input signal, sample the input signal, and generate at least a first output signal associated with one or more sampled magnitudes. For example, the input signal being associated with at least a first winding coupled to a secondary winding for a power converter, and the secondary winding is related to an output current and an output voltage for the power converter. Additionally, the system includes an error amplifier (e.g., as shown by the component 524) configured to receive at least the first output signal and a threshold voltage, generate a second output signal with a circuit for loop stabilization compensation, and generate a third output signal. For example, the circuit for loop stabilization compensation is a capacitor (e.g., as shown by the capacitor 526), and the capacitor is coupled to the error amplifier. Moreover, the system includes a feed forward component (e.g., as shown by the component 568) configured to receive the third output signal and generate a fourth output signal based on at least information associated with the third output signal, and a controller (e.g., as shown by the component 534) for regulating at least the output voltage. For example, the controller is configured to receive at least the second output signal and the fourth output signal, and generate at least a first control signal. Also, the system includes a signal generator (e.g., as shown by the component 538) configured to receive at least the first control signal and generate at least a modulation signal based on at least information associated with the first control signal, and a gate driver (e.g., as shown by the component 546) configured to receive at least the modulation signal and output at least a drive signal to a switch. For example, the switch is configured to affect a first current flowing through a primary winding coupled to the secondary winding.

For example, the controller (e.g., as shown by the component 534) is further configured to regulate the output voltage to a constant voltage level if the second output signal is smaller than a predetermined value in magnitude. In another example, the system further includes a compensation component (e.g., as shown by the component 532) configured to receive at least the second output signal and generate a compensation signal based on at least information associated with the second output signal. For example, the input signal is a combination of the compensation signal and a sensed signal, and the sensed signal is associated with at least the first winding coupled to the secondary winding.

According to yet another embodiment, a system for regulating a power converter is shown by, for example, FIGS. 5, 12(a) and 12(b) or FIGS. 5, 13(a) and FIG. 13(b). The system includes a sampling component (e.g., as shown by the component 522) configured to receive at least an input signal, sample the input signal, and generate at least a first output signal associated with one or more sampled magnitudes, and an error amplifier (e.g., as shown by the component 524) configured to receive at least the first output signal and a threshold voltage, generate a second output signal with a capacitor, and generate a third output signal, the capacitor being coupled to the error amplifier. Additionally, the system includes a feed forward component (e.g., as shown by the component 568) configured to receive the third output signal and generate a fourth output signal based on at least information associated with the third output signal, and a controller (e.g., as shown by the component 534) configured to receive at least the second output signal and the fourth output signal, and generate at least a control signal. Moreover, the system includes a compensation component (e.g., as shown by the component 532) configured to receive at least the second output signal and generate at least a compensation signal based on at least information associated with the second output signal, the input signal being a combination of the compensation signal and another signal.

For example, the second output signal is a voltage signal, and the compensation signal is a current signal. In another example, the system further includes a signal generator (e.g., as shown by the component 538) configured to receive at least the control signal, and generate at least a modulation signal based on at least information associated with the control signal, and a gate driver (e.g., as shown by the component 546) configured to receive at least the modulation signal and output at least a drive signal to a switch, the switch being configured to affect a current flowing through a primary winding for a power converter.

According to yet another embodiment, a system (e.g., as shown by FIGS. 5 and 15) for regulating a power converter includes a first signal generator (e.g., as shown by the component 520) configured to receive at least an input signal and generate at least a first output signal associated with demagnetization and a second output signal associated with sampling. For example, the input signal is associated with at least a first winding coupled to a secondary winding for a power converter, and the secondary winding is related to an output current and an output voltage for the power converter. Additionally, the system includes a sampling component (e.g., as shown by the component 522) configured to receive at least the input signal and the second output signal, sample the input signal based on at least information associated with the second output signal, and generate at least a third output signal associated with one or more sampled magnitudes. Moreover, the system includes a first controller (e.g., as shown by the component 542) for regulating at least the output current, which is configured to receive at least the first output signal and the third output signal and generate at least a first control signal based on at least information associated with the first output signal and the third output signal. Also, the system includes an oscillator (e.g., as shown by the component 562) configured to receive at least the first control signal and generate at least a clock signal based on at least information associated with the first control signal, and a second signal generator (e.g., as shown by the component 538) configured to receive at least the clock signal and a second control signal, and generate at least a modulation signal based on at least information associated with the clock signal and the second control signal. Additionally, the system includes a gate driver (e.g., as shown by the component 546) configured to receive at least the modulation signal and output at least a drive signal to a switch. For example, the switch is configured to affect a first current flowing through a primary winding coupled to the secondary winding. Moreover, the system includes a third controller (e.g., as shown by the component 540) for regulating at least a peak current is configured to receive at least a sensed signal and a threshold voltage, and output the second control signal to the second signal generator (e.g., as shown by the component 538). For example, the sensed signal is associated with the first current flowing through the primary winding for the power converter. The modulation signal corresponds to a switching frequency, and the first output signal corresponds to a demagnetization pulse width.

For example, the switching frequency is inversely proportional to the demagnetization pulse width, the switching period is proportional to the demagnetization pulse width, and the output current is proportional to the peak current. In another example, the peak current is constant, and the output current is constant. In another example, the system of claim 12 (e.g., as shown by FIGS. 5 and 15) wherein the first controller (e.g., as shown by the component 542) includes a voltage-to-current converter (e.g., as shown by the component 1510) configured to receive the third output signal and generate a second current, a phase-lock loop (e.g., as shown by the component 1530) configured to receive at least the first output signal and the clock signal and generate a third current, and a determining component (e.g., as shown by the component 1520) configured to receive the second current and the third current, determine a difference between the second current and the third current in magnitude, and generate the first control signal based on at least information associated with the second current and the third current.

According to yet another embodiment, a system (e.g., as shown by FIGS. 5 and 18) for regulating a power converter includes a controller (e.g., as shown by the component 540) for regulating at least a peak current. For example, the controller is configured to receive at least a sensed signal and a first threshold voltage and generate at least a first control signal, and the sensed signal is associated with a first current flowing through a primary winding for a power converter. Additionally, the system includes a signal generator (e.g., as shown by the component 538) configured to receive at least the first control signal and generate at least a modulation signal, and a gate driver (e.g., as shown by the component 546) configured to receive at least the modulation signal and output at least a drive signal to a switch. For example, the switch is configured to affect the first current. In another example, the controller (e.g., as shown by the component 540) includes a first comparator (e.g., as shown by the component 1810) configured to receive the sensed signal and the first threshold voltage and generate a comparison signal based on at least information associated with the sensed signal and the first threshold voltage, and a charge pump (e.g., as shown by the component 1820) configured to receive the comparison signal and generate a second control signal based on at least information associated with the comparison signal. Additionally, the controller (e.g., as shown by the component 540) includes a threshold generator (e.g., as shown by the component 1830) configured to receive the second control signal and generate a second threshold voltage based on at least information associated with the second control signal, and a second comparator (e.g., as shown by the component 1840) configured to receive the second threshold voltage and the sensed signal and generate the first control signal based on at least information associated with the second threshold voltage and the sensed signal.

According to yet another embodiment, a method (e.g., as implemented by FIG. 5) for regulating a power converter includes receiving at least an input signal by a first signal generator (e.g., as shown by the component 520), and generating at least a first output signal associated with demagnetization and a second output signal associated with sampling based on at least information associated with the input signal. Additionally, the method includes receiving at least the input signal and the second output signal by a sampling component (e.g., as shown by the component 522), sampling the input signal based on at least information associated with the second output signal, generating at least a third output signal associated with one or more sampled magnitudes, receiving at least the third output signal and a first threshold voltage by an error amplifier (e.g., as shown by the component 524), and generating at least a fourth output signal with a capacitor coupled to the error amplifier. Moreover, the method includes receiving at least the fourth output signal by a compensation component (e.g., as shown by the component 532), and generating at least a compensation signal based on at least information associated with the fourth output signal. For example, the input signal is a combination of the compensation signal and a first sensed signal. In another example, the first sensed signal is associated with a first winding coupled to a secondary winding for a power converter, and the secondary winding is related to an output current and an output voltage for the power converter. Also, the method includes receiving at least the first output signal and the third output signal by a first controller (e.g., as shown by the component 542) for regulating at least the output current, generating at least a first control signal based on at least information associated with the first output signal and the third output signal, receiving at least the fourth output signal by a second controller (e.g., as shown by the component 534) for regulating at least the output voltage, and generating at least a second control signal (e.g., as shown by the signal 558) and a third control signal (e.g., as shown by the signal 536) based on at least information associated with the fourth output signal. Additionally, the method includes receiving at least the first control signal and the second control signal by an oscillator (e.g., as shown by the component 562), generating at least a clock signal by the oscillator (e.g., as shown by the component 562), receiving at least the clock signal, the third control signal, and a fourth control signal by a second signal generator (e.g., as shown by the component 538), and generating at least a modulation signal by the second signal generator (e.g., as shown by the component 538). Moreover, the method includes receiving at least the modulation signal by a gate driver (e.g., as shown by the component 546), outputting at least a drive signal to a switch to affect a first current flowing through a primary winding coupled to the secondary winding, receiving the third control signal, a second sensed signal, and a second threshold voltage by a third controller (e.g., as shown by the component 540) for regulating at least a peak current; and outputting the fourth control signal to the second signal generator. For example, the second sensed signal is associated with the first current flowing through the primary winding for the power converter.

In another example, the method further includes receiving a fifth output signal by a feed forward component (e.g., as shown by the component 568) from the error amplifier (e.g., as shown by the component 524), and outputting a sixth output signal to the second controller (e.g., as shown by the component 534) based on at least information associated with fifth output signal. In yet another example, the method further includes regulating the output current to a constant current level if the fourth output signal is larger than a predetermined value in magnitude, and regulating the output voltage to a constant voltage level if the fourth output signal is smaller than the predetermined value in magnitude. In yet another example, the process for sampling the input signal includes sampling the input signal at or near a first end of a first demagnetization period, generating a first sampled magnitude corresponding to the first demagnetization period, sampling the input signal at or near a second end of a second demagnetization period, and generating a second sampled magnitude corresponding to the second demagnetization period. The first sampled magnitude and the second sampled magnitude are two of the one or more sampled magnitudes. In yet anther example, the process for generating at least a third output signal includes holding the first sampled magnitude until the second sampled magnitude is generated. In yet another example, the method (e.g., as implemented by FIGS. 5 and 8) the process for generating at least a first output signal associated with demagnetization and a second output signal associated with sampling includes receiving the third output signal, determining a third threshold voltage based on at least information associated with the third output signal, comparing the third threshold voltage and the input signal in magnitude, and generating the first output signal based on at least information associated with the third threshold voltage and the input signal.

According to yet another embodiment, a method (e.g., as implemented by FIGS. 5 and 7) for regulating a power converter includes receiving at least an input signal by a sampling component (e.g., as shown by the component 522). For example, the input signal is associated with at least a first winding coupled to a secondary winding for a power converter, and the secondary winding is related to an output current and an output voltage for the power converter. Additionally, the method includes sampling the input signal by the sampling component (e.g., as shown by the component 522), generating at least a first output signal associated with one or more sampled magnitudes, receiving at least the first output signal and a threshold voltage by an error amplifier (e.g., as shown by the component 524), and generating a second output signal with a capacitor coupled to the error amplifier. Moreover, the method includes generating a third output signal by the error amplifier, receiving the third output signal by a feed forward component, generating a fourth output signal based on at least information associated with the third output signal, receiving at least the second output signal and the fourth output signal by a controller (e.g., as shown by the component 534) for regulating at least the output voltage, and generating at least a first control signal based on at least information associated with the second output signal and the fourth output signal. Also, the method includes receiving at least the first control signal by a signal generator (e.g., as shown by the component 538), generating at least a modulation signal based on at least information associated with the first control signal, receiving at least the modulation signal by a gate driver (e.g., as shown by the component 546), and outputting at least a drive signal to a switch to affect a first current flowing through a primary winding coupled to the secondary winding.

For example, the method further includes regulating the output voltage to a constant voltage level if the second output signal is smaller than a predetermined value in magnitude. In another example, the method includes receiving at least the second output signal by a compensation component (e.g., as shown by the component 532), and generating a compensation signal based on at least information associated with the second output signal. The input signal is a combination of the compensation signal and a sensed signal, and the sensed signal is associated with at least the first winding coupled to the secondary winding.

Figure 12:
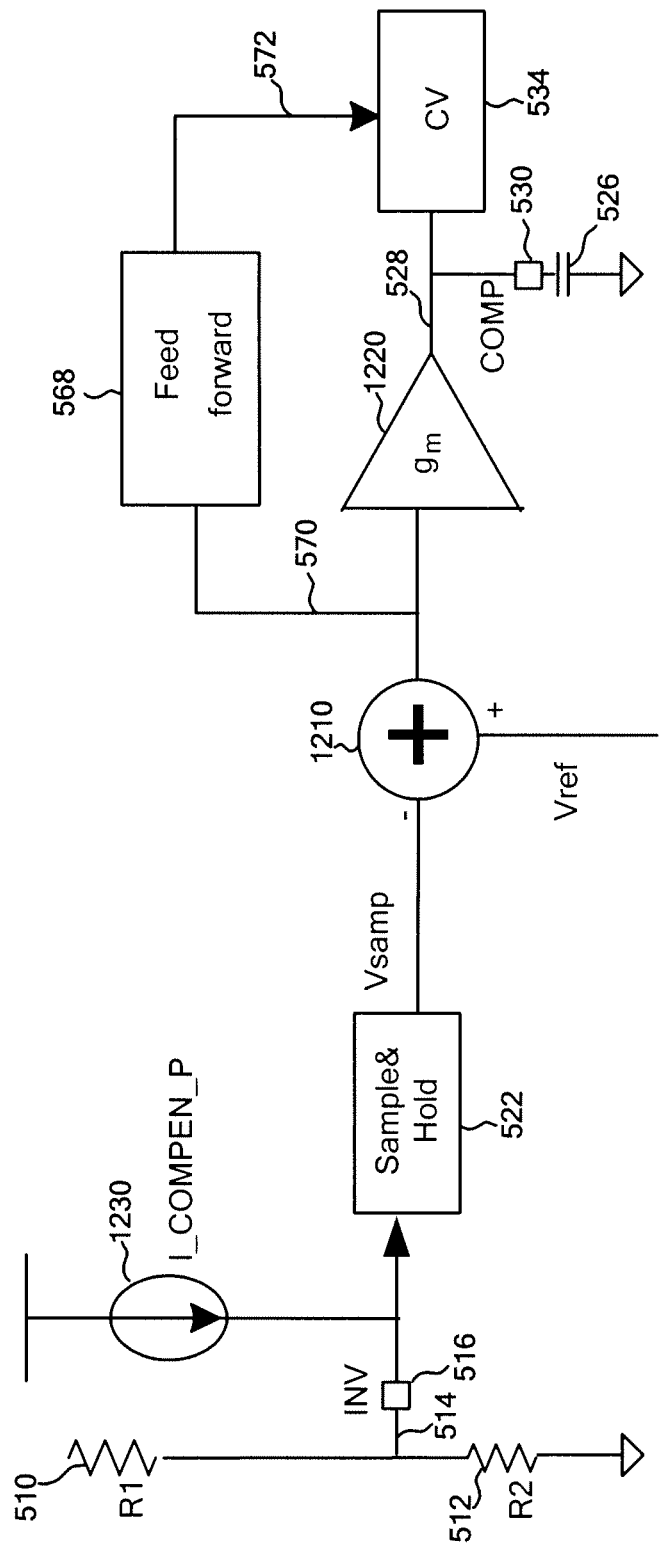
FIG. 12(a) is a simplified diagram showing certain devices for a component and an error amplifier as parts of the switch-mode power conversion system according to an embodiment of the present invention.
FIG. 12(b) is a simplified diagram showing certain devices for a current source as part of a component in the switch-mode power conversion system according to an embodiment of the present invention.
Figure 12:
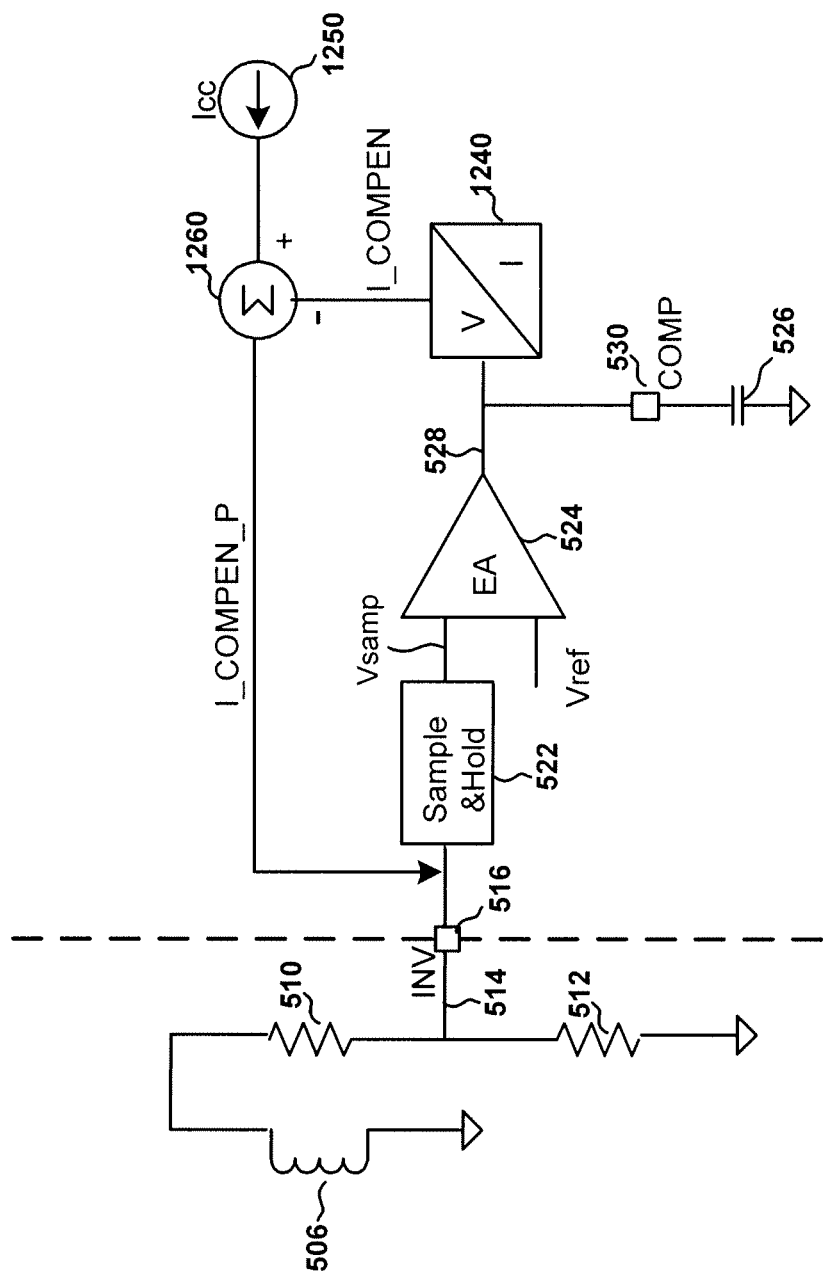
Figure 13:
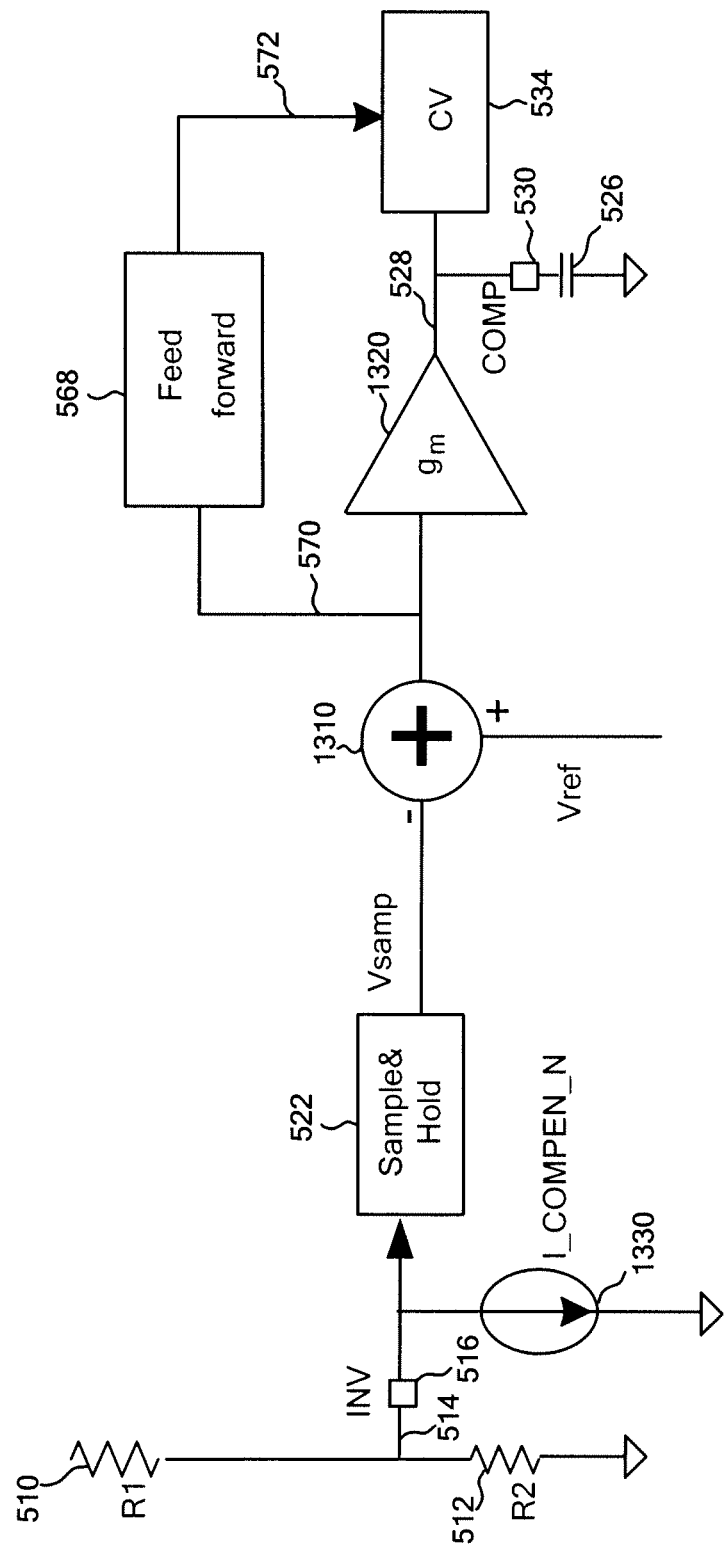
FIG. 13(a) is a simplified diagram showing certain devices for a component and an error amplifier as parts of the switch-mode power conversion system according to another embodiment of the present invention.
FIG. 13(b) is a simplified diagram showing certain devices for a current source as part of a component in the switch-mode power conversion system according to an embodiment of the present invention.
Figure 13:
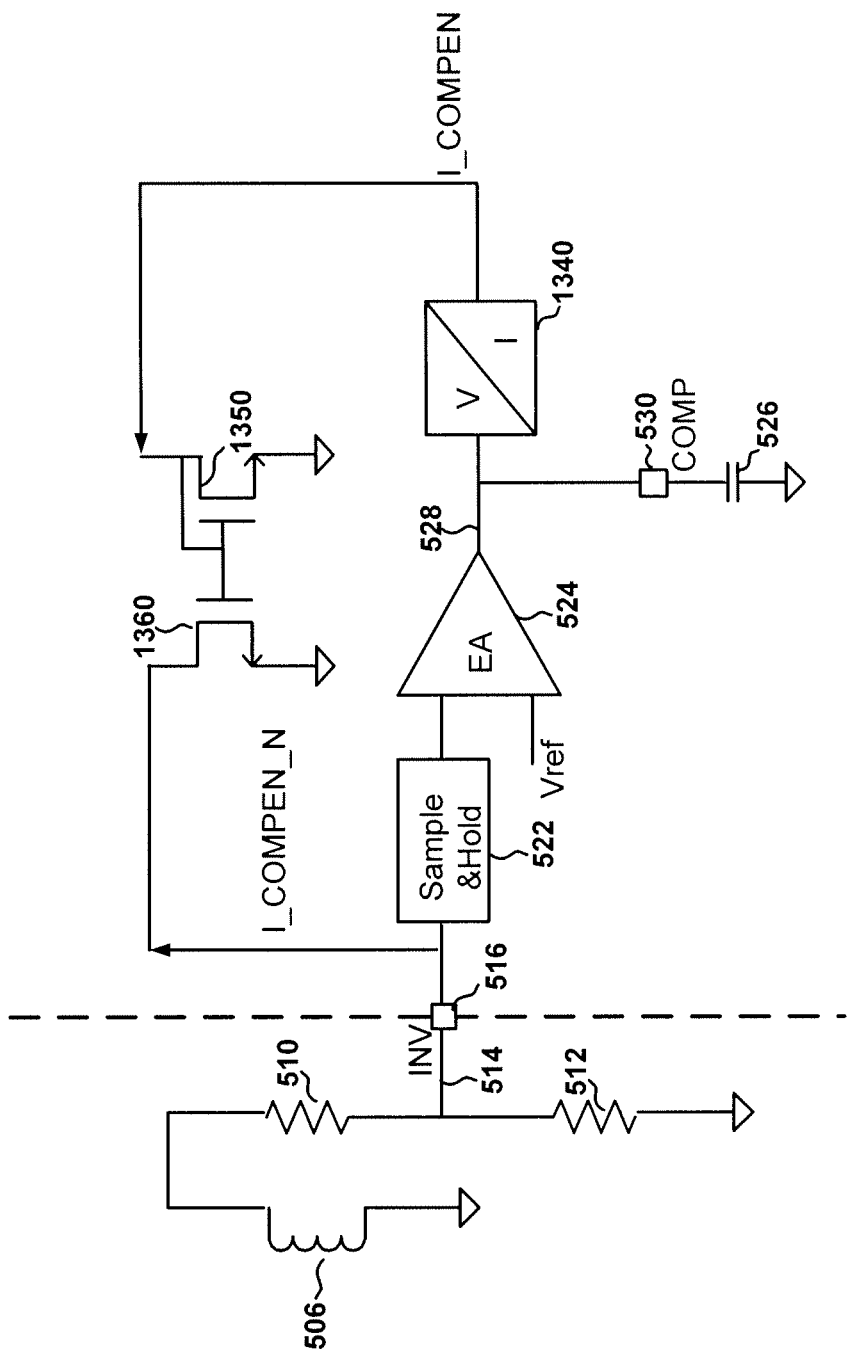

According to yet another embodiment, a method for regulating a power converter is implemented by, for example, FIGS. 5, 12(*a*) and 12(*b*) or FIGS. 5, 13(*a*) and FIG. 13(*b*). The method includes receiving at least an input signal by a sampling component (e.g., as shown by the component 522), sampling the input signal by the sampling component (e.g., as shown by the component 522), and generating at least a first output signal associated with one or more sampled magnitudes. Additionally, the method includes receiving at least the first output signal and a threshold voltage by an error amplifier (e.g., as shown by the component 524), generating a second output signal with a capacitor coupled to the error amplifier based on at least information associated with the first output signal and the threshold voltage, and generating a third output signal based on at least information associated with the first output signal and the threshold voltage. Moreover, the method includes receiving the third output signal by a feed forward component (e.g., as shown by the component 568), generating a fourth output signal based on at least information associated with the third output signal, receiving at least the second output signal and the fourth output signal by a controller (e.g., as shown by the component 534), and generating at least a control signal based on at least information associated with the second output signal and the fourth output signal. Also, the method includes receiving at least the second output signal by a compensation component (e.g., as shown by the component 532), and generating at least a compensation signal based on at least information associated with the second output signal, the input signal being a combination of the compensation signal and another signal.

For example, the second output signal is a voltage signal, and the compensation signal is a current signal. In another example, the method further includes receiving at least the control signal by a signal generator (e.g., as shown by the component 538), generating at least a modulation signal based on at least information associated with the control signal, receiving at least the modulation signal by a gate driver (e.g., as shown by the component 546), and outputting at least a drive signal to a switch to affect a current flowing through a primary winding for a power converter.

According to yet another embodiment, a method (e.g., as implemented by FIGS. 5 and 15) for regulating a power converter includes receiving at least an input signal by a first signal generator (e.g., as shown by the component 520). For example, the input signal is associated with at least a first winding coupled to a secondary winding for a power converter, and the secondary winding is related to an output current and an output voltage for the power converter. Additionally, the method includes generating at least a first output signal associated with demagnetization and a second output signal associated with sampling based on at least information associated with the input signal, receiving at least the input signal and the second output signal by a sampling component (e.g., as shown by the component 522), sampling the input signal based on at least information associated with the second output signal, and generating at least a third output signal associated with one or more sampled magnitudes. Moreover, the method includes receiving at least the first output signal and the third output signal by a first controller (e.g., as shown by the component 542) for regulating at least the output current, generating at least a first control signal based on at least information associated with the first output signal and the third output signal, receiving at least the first control signal by an oscillator (e.g., as shown by the component 562), and generating at least a clock signal based on at least information associated with the first control signal. Also, the method includes receiving at least the clock signal and a second control signal by a second signal generator (e.g., as shown by the component 538), generating at least a modulation signal based on at least information associated with the clock signal and the second control signal, receiving at least the modulation signal by a gate driver (e.g., as shown by the component 546), and outputting at least a drive signal to a switch to affect a first current flowing through a primary winding coupled to the secondary winding. Additionally, the method includes receiving at least a sensed signal and a threshold voltage by a third controller (e.g., as shown by the component 540) for regulating at least a peak current, and outputting the second control signal to the second signal generator (e.g., as shown by the component 538). The sensed signal being associated with the first current flowing through the primary winding for the power converter, the modulation signal corresponds to a switching frequency, and the first output signal corresponds to a demagnetization pulse width.

For example, the switching frequency is inversely proportional to the demagnetization pulse width, and the output current is proportional to the peak current. In another example, the peak current is constant, and the output current is constant.

In yet another example, as implemented by, for example, FIGS. 5 and 15, the process for generating at least a first control signal includes receiving the third output signal by a voltage-to-current converter (e.g., as shown by the component 1510), generating a second current based on at least information associated with the third output signal, receiving at least the first output signal and the clock signal by a phase-lock loop (e.g., as shown by the component 1530), and generating a third current based on at least information associated with the first output signal and the clock signal. Additionally, the process for generating at least a first control signal includes receiving the second current and the third current by a determining component (e.g., as shown by the component 1520) configured to determine a difference between the second current and the third current in magnitude, and generating the first control signal based on at least information associated with the second current and the third current.

According to yet another embodiment, a method (e.g., as implemented by FIGS. 5 and 18) for regulating a power converter includes receiving at least a sensed signal and a first threshold voltage by a controller (e.g., as shown by the component 540) for regulating at least a peak current. For example, the sensed signal is associated with a first current flowing through a primary winding for a power converter. Additionally, the method includes generating at least a first control signal based on at least information associated with the sensed signal and the first threshold voltage, receiving at least the first control signal by a signal generator (e.g., as shown by the component 538), generating at least a modulation signal based on at least information associated with the first control signal, receiving at least the modulation signal by a gate driver (e.g., as shown by the component 546), and outputting at least a drive signal to a switch to affect the first current. The process for generating at least a first control signal includes receiving the sensed signal and the first threshold voltage by a first comparator (e.g., as shown by the component 1810), generating a comparison signal based on at least information associated with the sensed signal and the first threshold voltage, receiving the comparison signal by a charge pump (e.g., as shown by the component 1820), generating a second control signal based on at least information associated with the comparison signal, receiving the second control signal by a threshold generator (e.g., as shown by the component 1830), generating a second threshold voltage based on at least information associated with the second control signal, receiving the second threshold voltage and the sensed signal by a second comparator (e.g., as shown by the component 1840), and generating the first control signal based on at least information associated with the second threshold voltage and the sensed signal.

Many benefits are achieved by way of the present invention over conventional techniques. Certain embodiments of the present invention can reduce parts count and/or decrease system cost. Some embodiments of the present invention can improve reliability and/or efficiency. Certain embodiments of the present invention can simplify circuit design in switch mode flyback power converters. Some embodiments of the present invention provide a primary side sensing and regulation scheme. For example, the primary side sensing and regulation scheme can improve the load regulation. In another example, the primary side sensing and regulation scheme can compensate the primary winding inductance variation to achieve constant output current in a flyback converter that employs the primary side regulation. Certain embodiments of the present invention can provide, in the CC mode, a constant output current that does not change as primary winding inductance changes.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating a power converter, the system comprising:
   a first signal generator configured to receive at least an input signal and generate at least a first output signal associated with demagnetization and a second output signal associated with sampling;
   a sampling component configured to receive at least the input signal and the second output signal, sample the input signal based on at least information associated with the second output signal, and generate at least a third output signal associated with one or more sampled magnitudes;
   an error amplifier configured to receive at least the third output signal and a first threshold voltage and generate at least a fourth output signal with a capacitor, the capacitor being coupled to the error amplifier;
   a compensation component configured to receive at least the fourth output signal and generate at least a compensation signal, the input signal being a combination of the compensation signal and a first sensed signal, the first sensed signal being associated with a first winding coupled to a secondary winding for a power converter, the secondary winding being related to an output current and an output voltage for the power converter;
   a first controller for regulating at least the output current, the first controller being configured to receive at least the first output signal and the third output signal and generate at least a first control signal based on at least information associated with the first output signal and the third output signal;
   a second controller for regulating at least the output voltage, the second controller being configured to receive at least the fourth output signal and generate at least a second control signal and a third control signal based on at least information associated with the fourth output signal;
   an oscillator configured to receive at least the first control signal and the second control signal and generate at least a clock signal;
   a second signal generator configured to receive at least the clock signal, the third control signal, and a fourth control signal, and generate at least a modulation signal;
   a gate driver configured to receive at least the modulation signal and output at least a drive signal to a switch, the switch being configured to affect a first current flowing through a primary winding coupled to the secondary winding; and
   a third controller for regulating at least a peak current, the third controller being configured to receive the third control signal, a second sensed signal, and a second threshold voltage, and output the fourth control signal to the second signal generator, the second sensed signal being associated with the first current flowing through the primary winding for the power converter.

2. The system of claim 1, and further comprising a feed forward component configured to receive a fifth output signal from the error amplifier and output a sixth output signal to the second controller.

3. The system of claim 1 is configured to regulate the output current to a constant current level if the fourth output signal is larger than a predetermined value in magnitude and regulate the output voltage to a constant voltage level if the fourth output signal is smaller than the predetermined value in magnitude.

4. The system of claim 1 wherein the sampling component is further configured to perform at least one sampling process for the input signal at or near an end of a demagnetization period, generate a first sampled magnitude, and hold the first sampled magnitude until a second sampled magnitude is generated, the first sampled magnitude and the second sampled magnitude being two of the one or more sampled magnitudes.

5. The system of claim 1 wherein the first signal generator is further configured to receive the third output signal, determine a third threshold voltage based on at least information associated with the third output signal, compare the third threshold voltage and the input signal in magnitude, and generate the first output signal based on at least information associated with the third threshold voltage and the input signal.

6. A system for regulating a power converter, the system comprising:
   a sampling component configured to receive at least an input signal, sample the input signal, and generate at least a first output signal associated with one or more sampled magnitudes, the input signal being associated with at least a first winding coupled to a secondary winding for a power converter, the secondary winding being related to an output current and an output voltage for the power converter;
   an error amplifier configured to receive at least the first output signal and a threshold voltage, generate a second output signal with a capacitor, and generate a third output signal, the capacitor being coupled to the error amplifier;
   a feed forward component configured to receive the third output signal and generate a fourth output signal based on at least information associated with the third output signal;
   a controller for regulating at least the output voltage, the controller being configured to receive at least the second output signal and the fourth output signal, and generate at least a first control signal;
   a signal generator configured to receive at least the first control signal and generate at least a modulation signal based on at least information associated with the first control signal; and
   a gate driver configured to receive at least the modulation signal and output at least a drive signal to a switch, the switch being configured to affect a first current flowing through a primary winding coupled to the secondary winding.

7. The system of claim 6 wherein the controller is further configured to regulate the output voltage to a constant voltage level if the second output signal is smaller than a predetermined value in magnitude.

8. The system of claim 6, and further comprising a compensation component configured to receive at least the second output signal and generate a compensation signal based on at least information associated with the second output signal, the input signal being a combination of the compensation signal and a sensed signal, the sensed signal being associated with at least the first winding coupled to the secondary winding.

9. A system for regulating a power converter, the system comprising:
   a sampling component configured to receive at least an input signal, sample the input signal, and generate at least a first output signal associated with one or more sampled magnitudes;
   an error amplifier configured to receive at least the first output signal and a threshold voltage, generate a second output signal with a capacitor, and generate a third output signal, the capacitor being coupled to the error amplifier;
   a feed forward component configured to receive the third output signal and generate a fourth output signal based on at least information associated with the third output signal;
   a controller configured to receive at least the second output signal and the fourth output signal, and generate at least a control signal; and
   a compensation component configured to receive at least the second output signal and generate at least a compensation signal based on at least information associated with the second output signal, the input signal being a combination of the compensation signal and another signal.

10. The system of claim 9 wherein:
    the second output signal is a voltage signal; and
    the compensation signal is a current signal.

11. The system of claim 9, and further comprising:
    a signal generator configured to receive at least the control signal, and generate at least a modulation signal based on at least information associated with the control signal; and
    a gate driver configured to receive at least the modulation signal and output at least a drive signal to a switch, the switch being configured to affect a current flowing through a primary winding for a power converter.

12. A system for regulating a power converter, the system comprising:
    a first signal generator configured to receive at least an input signal and generate at least a first output signal associated with demagnetization and a second output signal associated with sampling, the input signal being associated with at least a first winding coupled to a secondary winding for a power converter, the secondary winding being related to an output current and an output voltage for the power converter;
    a sampling component configured to receive at least the input signal and the second output signal, sample the input signal based on at least information associated with the second output signal, and generate at least a third output signal associated with one or more sampled magnitudes;
    a first controller for regulating at least the output current, the first controller being configured to receive at least the first output signal and the third output signal and generate at least a first control signal based on at least information associated with the first output signal and the third output signal;
    an oscillator configured to receive at least the first control signal and generate at least a clock signal based on at least information associated with the first control signal;

a second signal generator configured to receive at least the clock signal and a second control signal, and generate at least a modulation signal based on at least information associated with the clock signal and the second control signal;

a gate driver configured to receive at least the modulation signal and output at least a drive signal to a switch, the switch being configured to affect a first current flowing through a primary winding coupled to the secondary winding; and a third controller for regulating at least a peak current, the third controller being configured to receive at least a sensed signal and a threshold voltage, and output the second control signal to the second signal generator, the sensed signal being associated with the first current flowing through the primary winding for the power converter;

wherein:
the modulation signal corresponds to a switching frequency; and
the first output signal corresponds to a demagnetization pulse width.

13. The system of claim 12 wherein:
the switching frequency is inversely proportional to the demagnetization pulse width; and
the output current is proportional to the peak current.

14. The system of claim 13 wherein:
the peak current is constant; and
the output current is constant.

15. The system of claim 12 wherein the first controller includes:
a voltage-to-current converter configured to receive the third output signal and generate a second current;
a phase-lock loop configured to receive at least the first output signal and the clock signal and generate a third current;
a determining component configured to receive the second current and the third current, determine a difference between the second current and the third current in magnitude, and generate the first control signal based on at least information associated with the second current and the third current.

16. A system for regulating a power converter, the system comprising:
a controller for regulating at least a peak current, the controller being configured to receive at least a sensed signal and a first threshold voltage and generate at least a first control signal, the sensed signal being associated with a first current flowing through a primary winding for a power converter;
a signal generator configured to receive at least the first control signal and generate at least a modulation signal; and
a gate driver configured to receive at least the modulation signal and output at least a drive signal to a switch, the switch being configured to affect the first current;

wherein the controller includes:
a first comparator configured to receive the sensed signal and the first threshold voltage and generate a comparison signal based on at least information associated with the sensed signal and the first threshold voltage;
a charge pump configured to receive the comparison signal and generate a second control signal based on at least information associated with the comparison signal;

a threshold generator configured to receive the second control signal and generate a second threshold voltage based on at least information associated with the second control signal; and a second comparator configured to receive the second threshold voltage and the sensed signal and generate the first control signal based on at least information associated with the second threshold voltage and the sensed signal.

17. A method for regulating a power converter, the method comprising:
receiving at least an input signal by a first signal generator;
generating at least a first output signal associated with demagnetization and a second output signal associated with sampling based on at least information associated with the input signal;
receiving at least the input signal and the second output signal by a sampling component;
sampling the input signal based on at least information associated with the second output signal;
generating at least a third output signal associated with one or more sampled magnitudes;
receiving at least the third output signal and a first threshold voltage by an error amplifier;
generating at least a fourth output signal with a capacitor coupled to the error amplifier;
receiving at least the fourth output signal by a compensation component;
generating at least a compensation signal based on at least information associated with the fourth output signal, the input signal being a combination of the compensation signal and a first sensed signal, the first sensed signal being associated with a first winding coupled to a secondary winding for a power converter, the secondary winding being related to an output current and an output voltage for the power converter;
receiving at least the first output signal and the third output signal by a first controller for regulating at least the output current;
generating at least a first control signal based on at least information associated with the first output signal and the third output signal;
receiving at least the fourth output signal by a second controller for regulating at least the output voltage;
generating at least a second control signal and a third control signal based on at least information associated with the fourth output signal;
receiving at least the first control signal and the second control signal by an oscillator;
generating at least a clock signal by the oscillator;
receiving at least the clock signal, the third control signal, and a fourth control signal by a second signal generator;
generating at least a modulation signal by the second signal generator;
receiving at least the modulation signal by a gate driver;
outputting at least a drive signal to a switch to affect a first current flowing through a primary winding coupled to the secondary winding;
receiving the third control signal, a second sensed signal, and a second threshold voltage by a third controller for regulating at least a peak current; and
outputting the fourth control signal to the second signal generator, the second sensed signal being associated with the first current flowing through the primary winding for the power converter.

18. The method of claim 17, and further comprising:
receiving a fifth output signal by a feed forward component from the error amplifier; and
outputting a sixth output signal to the second controller based on at least information associated with fifth output signal.

19. The method of claim 17, and further comprising:
regulating the output current to a constant current level if the fourth output signal is larger than a predetermined value in magnitude; and
regulating the output voltage to a constant voltage level if the fourth output signal is smaller than the predetermined value in magnitude.

20. The method of claim 17 wherein the process for sampling the input signal includes:
sampling the input signal at or near a first end of a first demagnetization period;
generating a first sampled magnitude corresponding to the first demagnetization period;
sampling the input signal at or near a second end of a second demagnetization period; and
generating a second sampled magnitude corresponding to the second demagnetization period;
wherein the first sampled magnitude and the second sampled magnitude are two of the one or more sampled magnitudes.

21. The method of claim 20 wherein the process for generating at least a third output signal includes holding the first sampled magnitude until the second sampled magnitude is generated.

22. The method of claim 17 wherein the process for generating at least a first output signal associated with demagnetization and a second output signal associated with sampling includes:
receiving the third output signal;
determining a third threshold voltage based on at least information associated with the third output signal;
comparing the third threshold voltage and the input signal in magnitude; and
generating the first output signal based on at least information associated with the third threshold voltage and the input signal.

23. A method for regulating a power converter, the method comprising:
receiving at least an input signal by a sampling component, the input signal being associated with at least a first winding coupled to a secondary winding for a power converter, the secondary winding being related to an output current and an output voltage for the power converter;
sampling the input signal by the sampling component;
generating at least a first output signal associated with one or more sampled magnitudes;
receiving at least the first output signal and a threshold voltage by an error amplifier;
generating a second output signal with a capacitor coupled to the error amplifier;
generating a third output signal by the error amplifier;
receiving the third output signal by a feed forward component;
generating a fourth output signal based on at least information associated with the third output signal;
receiving at least the second output signal and the fourth output signal by a controller for regulating at least the output voltage;
generating at least a first control signal based on at least information associated with the second output signal and the fourth output signal;
receiving at least the first control signal by a signal generator;
generating at least a modulation signal based on at least information associated with the first control signal;
receiving at least the modulation signal by a gate driver; and
outputting at least a drive signal to a switch to affect a first current flowing through a primary winding coupled to the secondary winding.

24. The method of claim 23, and further comprising regulating the output voltage to a constant voltage level if the second output signal is smaller than a predetermined value in magnitude.

25. The method of claim 23, and further comprising:
receiving at least the second output signal by a compensation component; and
generating a compensation signal based on at least information associated with the second output signal;
wherein:
the input signal is a combination of the compensation signal and a sensed signal; and
the sensed signal is associated with at least the first winding coupled to the secondary winding.

26. A method for regulating a power converter, the method comprising:
receiving at least an input signal by a sampling component;
sampling the input signal by the sampling component;
generating at least a first output signal associated with one or more sampled magnitudes;
receiving at least the first output signal and a threshold voltage by an error amplifier;
generating a second output signal with a capacitor coupled to the error amplifier based on at least information associated with the first output signal and the threshold voltage;
generating a third output signal based on at least information associated with the first output signal and the threshold voltage;
receiving the third output signal by a feed forward component;
generating a fourth output signal based on at least information associated with the third output signal;
receiving at least the second output signal and the fourth output signal by a controller;
generating at least a control signal based on at least information associated with the second output signal and the fourth output signal;
receiving at least the second output signal by a compensation component; and
generating at least a compensation signal based on at least information associated with the second output signal, the input signal being a combination of the compensation signal and another signal.

27. The method of claim 26 wherein:
the second output signal is a voltage signal; and
the compensation signal is a current signal.

28. The method of claim 26, and further comprising:
receiving at least the control signal by a signal generator; and
generating at least a modulation signal based on at least information associated with the control signal;
receiving at least the modulation signal by a gate driver; and outputting at least a drive signal to a switch to affect a current flowing through a primary winding for a power converter.

29. A method for regulating a power converter, the method comprising:
receiving at least an input signal by a first signal generator, the input signal being associated with at least a first winding coupled to a secondary winding for a power converter, the secondary winding being related to an output current and an output voltage for the power converter;
generating at least a first output signal associated with demagnetization and a second output signal associated with sampling based on at least information associated with the input signal;
receiving at least the input signal and the second output signal by a sampling component;
sampling the input signal based on at least information associated with the second output signal;
generating at least a third output signal associated with one or more sampled magnitudes;
receiving at least the first output signal and the third output signal by a first controller for regulating at least the output current;
generating at least a first control signal based on at least information associated with the first output signal and the third output signal;
receiving at least the first control signal by an oscillator;
generating at least a clock signal based on at least information associated with the first control signal;
receiving at least the clock signal and a second control signal by a second signal generator;
generating at least a modulation signal based on at least information associated with the clock signal and the second control signal;
receiving at least the modulation signal by a gate driver;
outputting at least a drive signal to a switch to affect a first current flowing through a primary winding coupled to the secondary winding;
receiving at least a sensed signal and a threshold voltage by a third controller for regulating at least a peak current; and
outputting the second control signal to the second signal generator;
wherein:
the sensed signal being associated with the first current flowing through the primary winding for the power converter;
the modulation signal corresponds to a switching frequency; and
the first output signal corresponds to a demagnetization pulse width.

30. The method of claim 29 wherein:
the switching frequency is inversely proportional to the demagnetization pulse width; and
the output current is proportional to the peak current.

31. The method of claim 30 wherein:
the peak current is constant; and
the output current is constant.

32. The method of claim 29 wherein the process for generating at least a first control signal includes:
receiving the third output signal by a voltage-to-current converter;
generating a second current based on at least information associated with the third output signal;
receiving at least the first output signal and the clock signal by a phase-lock loop;
generating a third current based on at least information associated with the first output signal and the clock signal;
receiving the second current and the third current by a determining component configured to determine a difference between the second current and the third current in magnitude; and
generating the first control signal based on at least information associated with the second current and the third current.

33. A method for regulating a power converter, the method comprising:
receiving at least a sensed signal and a first threshold voltage by a controller for regulating at least a peak current, the sensed signal being associated with a first current flowing through a primary winding for a power converter;
generating at least a first control signal based on at least information associated with the sensed signal and the first threshold voltage;
receiving at least the first control signal by a signal generator;
generating at least a modulation signal based on at least information associated with the first control signal;
receiving at least the modulation signal by a gate driver; and
outputting at least a drive signal to a switch to affect the first current;
wherein the process for generating at least a first control signal includes:
receiving the sensed signal and the first threshold voltage by a first comparator;
generating a comparison signal based on at least information associated with the sensed signal and the first threshold voltage;
receiving the comparison signal by a charge pump;
generating a second control signal based on at least information associated with the comparison signal;
receiving the second control signal by a threshold generator;
generating a second threshold voltage based on at least information associated with the second control signal;
receiving the second threshold voltage and the sensed signal by a second comparator; and
generating the first control signal based on at least information associated with the second threshold voltage and the sensed signal.

* * * * *